(12) United States Patent
Baumann et al.

(10) Patent No.: US 9,703,637 B2
(45) Date of Patent: Jul. 11, 2017

(54) UNDO SYSTEM

(71) Applicant: Apple Inc., Cupertino, CA (US)

(72) Inventors: Laurent Baumann, Sunnyvale, CA (US); Angela J. Guzman Suarez, San Jose, CA (US)

(73) Assignee: APPLE INC., Cupertino, CA (US)

( * ) Notice: Subject to any disclaimer, the term of this patent is extended or adjusted under 35 U.S.C. 154(b) by 241 days.

(21) Appl. No.: 13/954,417

(22) Filed: Jul. 30, 2013

(65) Prior Publication Data
US 2015/0039566 A1 Feb. 5, 2015

(51) Int. Cl.
 G06F 12/00 (2006.01)
 G06F 11/14 (2006.01)
 G06F 9/44 (2006.01)

(52) U.S. Cl.
 CPC ........ *G06F 11/1446* (2013.01); *G06F 9/4443* (2013.01)

(58) Field of Classification Search
 CPC ............. G06F 11/1466; G06F 11/1446; G06F 17/30008; G06F 11/1469; G06F 11/1471; G06F 12/00
 USPC ........................... 707/684, 678, 674; 709/202
 See application file for complete search history.

(56) References Cited

U.S. PATENT DOCUMENTS

| | | | | |
|---|---|---|---|---|
| 5,890,181 A | * | 3/1999 | Selesky | G06F 17/21 715/255 |
| 5,990,906 A | * | 11/1999 | Hudson | G06F 8/34 345/666 |
| 6,192,378 B1 | * | 2/2001 | Abrams | G06F 17/30362 |
| 9,229,920 B1 | * | 1/2016 | Fiedler | G06F 17/24 |

(Continued)

FOREIGN PATENT DOCUMENTS

| | | |
|---|---|---|
| EP | 2 343 643 A1 | 7/2011 |
| WO | WO 2008/084437 A1 | 7/2008 |

OTHER PUBLICATIONS

International Search Report and Written Opinion, dated Sep. 30, 2014, received in International Patent Application No. PCT/US2014/041841, which corresponds with U.S. Appl. No. 13/954,417, 10 pages.

(Continued)

*Primary Examiner* — Hosain Alam
*Assistant Examiner* — Robert F May
(74) *Attorney, Agent, or Firm* — Morgan, Lewis & Bockius LLP

(57) ABSTRACT

Systems and methods for undo mechanism are provided. Computer systems can have many different software elements, including application elements and file management elements. System elements can be used for user input, providing output, and manipulating data or files. In the course of using a computer system, the user may wish to return to a previous system state by undoing one or more events. In one aspect, an undo operation can be performed across multiple elements in the system (e.g., cross-application undo functionality). In another aspect, past information displayed on a display can be "recorded" so that it can later be rewound as part of a media player metaphor, and events associated with the rewound/displayed information can be undone. The media player and rewind metaphors assist users in recalling past events and/or finding actions to undo.

26 Claims, 18 Drawing Sheets

(56) References Cited

U.S. PATENT DOCUMENTS

2004/0267877 A1* 12/2004 Shapiro ............ G06F 17/30067
709/202
2011/0107246 A1 5/2011 Vik
2011/0252378 A1* 10/2011 Anzures ............. G06F 3/04883
715/835
2013/0120439 A1* 5/2013 Harris ................. G11B 27/034
345/619

OTHER PUBLICATIONS

International Preliminary Report on Patentability, dated Feb. 2, 2016, received in International Patent Application No. PCT/US2014/041841, which corresponds with U.S. Appl. No. 13/954,417, 7 pages.

* cited by examiner

UNDO SYSTEM

TECHNICAL FIELD

The present disclosure relates generally to computer-implemented systems and methods for an undo mechanism.

BACKGROUND

The present disclosure relates generally to an undo mechanism for computing devices. In particular, some embodiments relate to enhanced features, improved user interfaces, and other user interaction technologies that can be implemented by and/or otherwise embodied in computing devices and computer software that provide undo functionality.

Computer systems can have many different software elements, including application elements and file management elements. System elements can be used for user input, providing output, and manipulating data or files. In the course of using a computer system, the user may wish to return to a previous system state by undoing one or more events. In current systems, a user can undo one or more actions within a single application by activating an undo operation (e.g., Control-Z, Command-Z, activating an undo icon, or similar). The undo function undoes the last undoable action. In some instances, the user does not know what event will be undone or cannot easily interpret from the user interface what event will be undone. In other instances, undo functionality works only from within a certain application or program.

Embodiments of the invention address these and other problems both individually and collectively.

SUMMARY

In accordance with the teachings provided herein, systems and methods for an undo mechanism are provided. In some embodiments, a system and method can be configured to provide an undo operation that can be performed across multiple elements in the system (e.g., cross-application undo functionality). In some embodiments, past information displayed on a display can be "recorded" and rewound as part of a media player metaphor, and events associated with the rewound/recorded information can be undone. In some embodiments, a cross-application undo functionality is provided with an undo rewind media player metaphor user interface.

In some embodiments, a computer-implemented method comprises receiving a sequence of events by a computer system. The sequence of events can be provided from within a plurality of elements in the computer system. The method can comprise storing the sequence of events in an ordered list as they occurred in time starting with the first event and ending with the last event, receiving input corresponding to a selection of an undo operation, and undoing events in the sequence of events across the plurality of elements in the computer system. The undoing events can begin the undo operation with the last event in the ordered list, where the last event occurred most recently in time.

In some embodiments, a computer-implemented system comprises one or more data processors and one or more non-transitory computer-readable storage media. The computer-readable storage media can include instructions configured to cause the one or more data processors to perform various operations, including receiving a sequence of events provided within a plurality of elements in a computer system, storing the sequence of events in a chronologically ordered list, receiving input corresponding to a selection of an undo operation, and undoing events in the sequence of events across the plurality of elements in the computer system, wherein undoing events begins with the last event in the ordered list that occurred most recently in time.

In some embodiments, a computer-program product tangibly embodied in a non-transitory machine-readable storage medium, includes instructions configured to cause a data processing apparatus to: receive a sequence of events, wherein the sequence of events is provided within a plurality of elements in a computer system; store the sequence of events in an ordered list, wherein the ordered list includes the sequence of events as the events occurred in time starting with the first event and ending with the last event; receive input corresponding to a selection of an undo operation; and undo events in the sequence of events across the plurality of elements in the computer system, wherein undoing event includes beginning the undo operation with the last event in the ordered list, and wherein the last event occurred most recently in time.

Particular embodiments of the subject matter described in this specification can be implemented to realize one or more of the following advantages.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 5 illustrates a first user interface and stack state according to an embodiment of the present invention.

FIG. 6 illustrates a second user interface and stack state, subsequent to FIG. 5, according to an embodiment of the present invention.

FIG. 7 illustrates a third user interface and stack state, subsequent to FIG. 6, according to an embodiment of the present invention.

FIG. 8 illustrates a fourth user interface and stack state, subsequent to FIG. 7, according to an embodiment of the present invention.

FIG. 9 illustrates a fifth user interface and stack state, subsequent to FIG. 8, according to an embodiment of the present invention.

FIG. 10 illustrates a sixth user interface and stack state, subsequent to FIG. 9, according to an embodiment of the present invention.

FIG. 11 illustrates a seventh user interface and stack state, subsequent to FIG. 10, according to an embodiment of the present invention.

FIG. 12 illustrates an eighth user interface and stack state, subsequent to FIG. 11, according to an embodiment of the present invention.

FIG. 13 illustrates a ninth user interface and stack state, subsequent to FIG. 12, according to an embodiment of the present invention.

FIG. 14 illustrates a tenth user interface and stack state, subsequent to FIG. 13, according to an embodiment of the present invention.

FIG. 15 illustrates an eleventh user interface and stack state, subsequent to FIG. 14, according to an embodiment of the present invention.

FIGS. 16-18 illustrate a user interface of a computer system and an undo stack after an undo input is received.

FIG. 16 illustrates an undo rewind embodiment according to an embodiment of the present invention.

FIG. 17 illustrates an undo rewind embodiment according to an embodiment of the present invention.

FIG. 18 illustrates an undo rewind embodiment according to an embodiment of the present invention.

Like reference numbers and designations in the various drawings indicate like elements.

DETAILED DESCRIPTION

Figure 1:
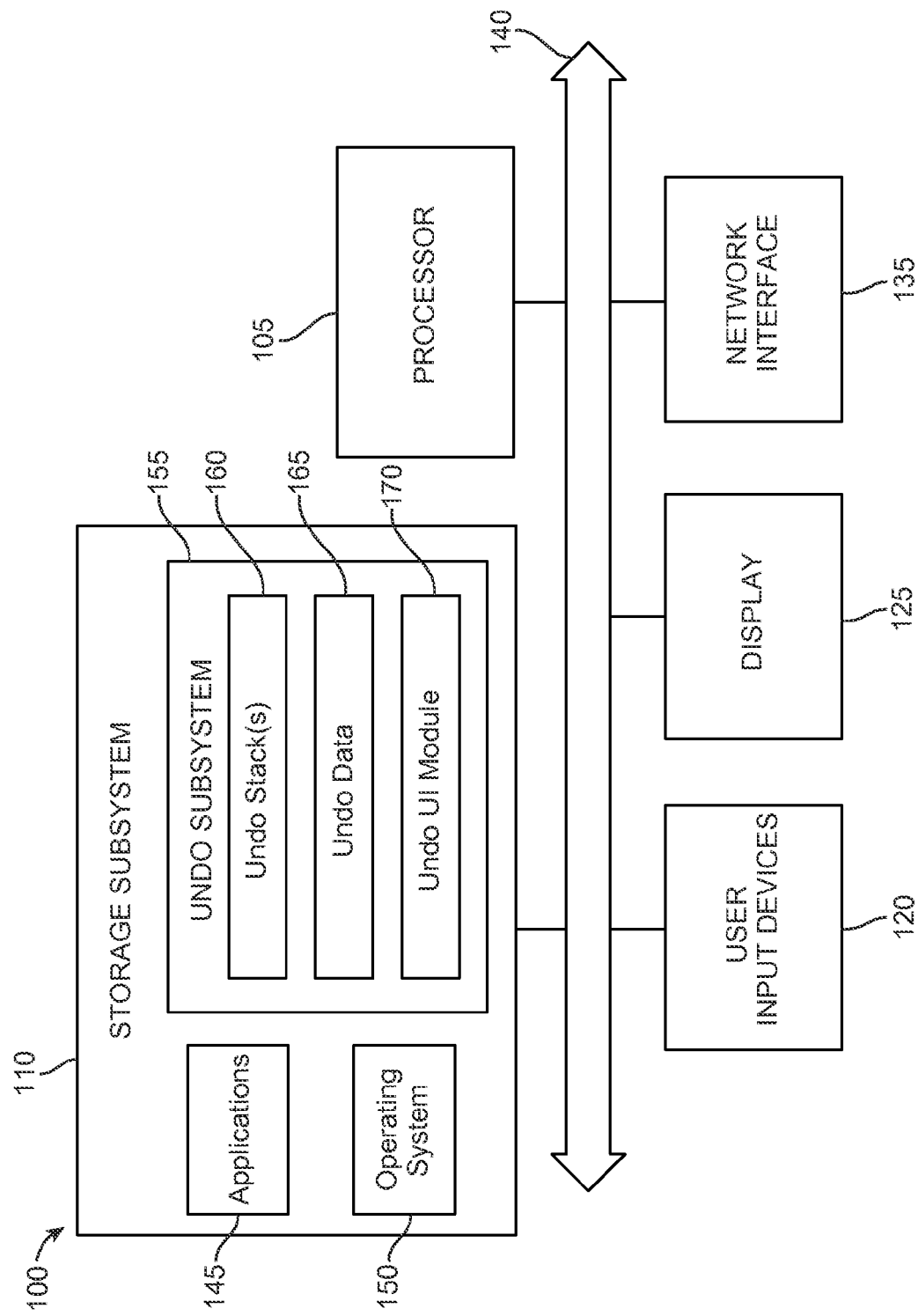
FIG. 1 is a block diagram of an example computer system according to an embodiment of the present invention.

Embodiments of the present invention are directed to an undo mechanism. In one embodiment, an undo operation can be performed across multiple elements in the system. In another embodiment, past information displayed on a display can be rewound as part of a media player metaphor, and events associated with the rewound/displayed information can be undone. In another embodiment, a cross-application undo functionality is provided with an undo rewind media player metaphor user interface.

In one aspect, an entire user interface of a computer system can include an undo mechanism. An undo operation can be performed across multiple elements in the system (e.g., cross-application undo functionality). Computer systems have many system elements, including operating systems, applications, and various other software features or apps that provide numerous functionalities. These system elements can receive events, including user input events and other events.

For example, assume that a first file is saved in a first application; then, using a file manager, the first file is moved from a first location to a second location; and then a second file is opened, edited and saved in a second application. Cross-application undo functionality can undo these events, across the system elements, in a sequential order that is the reverse of the sequence in which the events were received. For example, responsive to an undo input, the undo mechanism can undo one or more of the opening, editing, or saving of the second document in the second application. Responsive to another undo input or continued undo input, the undo mechanism can undo the moving of the first file. Responsive to another undo input or continued undo input, the undo mechanism can undo the saving of the first file in the first application. Therefore, events that occurred in separate elements of the system can be undone responsive to one or more undo inputs.

In another aspect, visual data can be used to show the user's past actions that can be undone. Instead of a very abstract undo command (Command+Z), the undo mechanism can use a videotape recorder metaphor, or a media player metaphor, that is easy for users to understand. For example, in one implementation, a "recording" can be kept of all information that was displayed on a display. In some embodiments, a history of 15 minutes, for example, could be stored. The size of the recording/buffer could depend on the available space and/or the intensity of the recording process.

The undo mechanism can store visual data that can be used to rewind and playback information displayed by the user interface, similar to how a movie can be rewound and played back. Therefore, the past information displayed on the display can be rewound and replayed (e.g., instant replay). In some embodiments, the rewind operation rewinds user input at an accelerated speed.

In some embodiments, the rewind operation includes an analog-like effect that causes the information displayed during the rewinding to appear similar to how TV looks when a traditional VCR rewinds or fast forwards (e.g., the displayed images can be somewhat distorted and/or include visual artifacts such as "snow"). This has the benefit of providing an indication to the user that the computing device is in a rewind mode using a familiar visual indicator of rewinding. This could be implemented, for example, by applying an analog filter to the recording or other visual data captured prior to receiving the undo input. Other filters could be applied instead of, or in addition to, an analog filter to achieve the desired visual appearance of the information displayed during the rewind process. In some embodiments, audio indicating the rewind process can be played on the computing device. For example, audio that sounds like rewinding audio on a traditional VCR could be played as the information displayed is rewinding. The frequency of the audio can indicate the speed of the rewinding.

At any point in time, an undo rewind input can be received to cause the display to rewind and go back to previous display stated. Responsive to a user input (e.g., an undo rewind button), the information displayed on the screen can visually reverse the information previously displayed on the screen. For example, when a user provides an undo rewind user input, the computer system could display everything in reverse, e.g. mouse pointer moves backward, your keyboard entries appear in reverse, a movie could play backward, etc.

For example, the user could just press rewind for a couple of seconds and go back exactly where the user was before moving the first file in the example above. Upon activation of the rewind button, the visual data can be displayed in reverse order. In one embodiment, an undo rewind button can be pressed and/or held down for an amount of time. In some embodiments, one or more actions associated with the visual data can be undone. In some embodiments, the rewind metaphor is used to assist the user in finding an action to be undone, but the rewind step itself does not actually undo any events alone. The undo button and rewind button can be separate buttons or the same button.

An undo system for use in some embodiments of the present invention will now be described.

I. Undo Computer System

FIG. 1 illustrates a computer system 100 according to an embodiment of the present invention. Computer system 100 can be implemented as any of various computing devices, including, e.g., a desktop or laptop computer, tablet computer, smart phone, personal data assistant (PDA), or any other type of computing device, not limited to any particular form factor. Computer system 100 can include processing unit(s) 105, storage subsystem 110, input devices 120, display 125, network interface 135, and bus 140.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of electronic device 100. The permanent storage device can be a read-and-write memory device. This permanent storage device can be a non-volatile memory unit that stores instructions and data even when computer system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer-readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer-readable storage media do not include carrier waves and transitory electronic signals passing wirelessly or over wired connections.

In some embodiments, storage subsystem 110 can store one or more software program elements to be executed by processing unit(s) 105, such as applications 145 or operating system 150. "Software" refers generally to sequences of instructions that, when executed by processing unit(s) 105, cause computer system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieve program instructions to execute and data to process in order to execute various operations described herein.

Software program elements can include, but are not limited to, file manager applications (e.g., Finder in Mac OS X), word processing applications, spreadsheet applications, presentation applications, internet browsers, messaging applications, email applications, video editing applications, audio editing applications, calendar applications, address book applications, media players, and the like. Software program elements can also include other software applications, or software application features, such as settings manipulation applications (e.g., System Preferences in Mac OS X or Settings in iOS devices where user can make changes to various settings), search windows (e.g., Spotlight in Mac OS X and iOS devices), notification applications (e.g., Notification Center in Mac OS X and iOS devices), multitasking windows, desktop, dock or Springboard arrangement applications, and the like.

Storage subsystem 110 can include an undo subsystem 155. In some embodiments, undo subsystem 155 is a cross-application undo system that enables undo functionality across multiple system elements. In some embodiments, there may be an undo subsystem 155 that is specific to a particular system element (e.g., an undo subsystem for a particular application or program). For example, the undo rewind functionality of the present invention can be used in a single system element or across multiple system elements. Therefore, although undo subsystem 155 is illustrated as a block separate from application 145 and operating system 150, it is understood that one or more undo subsystems may be part of the applications or system level software.

Undo subsystem 155 can include an undo stack 160 (or list) for maintaining a list of items for an undo operation. In some embodiments, the list may include an indication of whether the event is an event that can be undone or not (e.g., an undo flag). Undo stack 160 can be ordered from a first event to a last event. For example, the last event can be the latest event in time and the first event to be undone upon receipt of an undo operation input. The first event can be the earliest event in time stored in the stack and the last event to be undone. Certain additional details of undo stacks 160 are described with reference to FIG. 3 below.

Many types of events, received from different system elements, can be visually reversed or undone in a computer system. Any event that causes the display on a computing device (or associated with a computing device) to change the information displayed can be an event that can be visually reversed and/or undone. Events that are undoable can include application level events (e.g., user input in a word processor), file manager events (e.g., moving a file from a first location to a second location, such as to another folder or to the trash can, or launching applications), settings change events (e.g., changing the settings of the computer system from a first mode to a second mode), user interface modification events (e.g., resizing a window from a first size to a second size, minimizing or expanding a window, entering a full screen mode, etc.), and the like. These examples are exemplary in nature only and are not exhaustive or limiting.

Certain events may not be undoable. For example, the sending of an email or the reformatting of a disk may not be undoable. In some embodiments, events that are not undoable are flagged. In some embodiments, events that are not undoable are not included in the list undo stack 160. In some embodiments, events that are not undoable are included in the undo stack 160 along with a flag indicating that the event is not undoable.

Undo subsystem 155 can include undo data 165. In some embodiments, undo data 165 is linked to a particular event in undo stack 160. In some embodiments, the undo data includes an event identifier (event ID), an event time, an event application, visual data associated with the event, or other suitable information. For example, visual data representing information displayed during the event can be stored and associated with the event.

Figure 4:
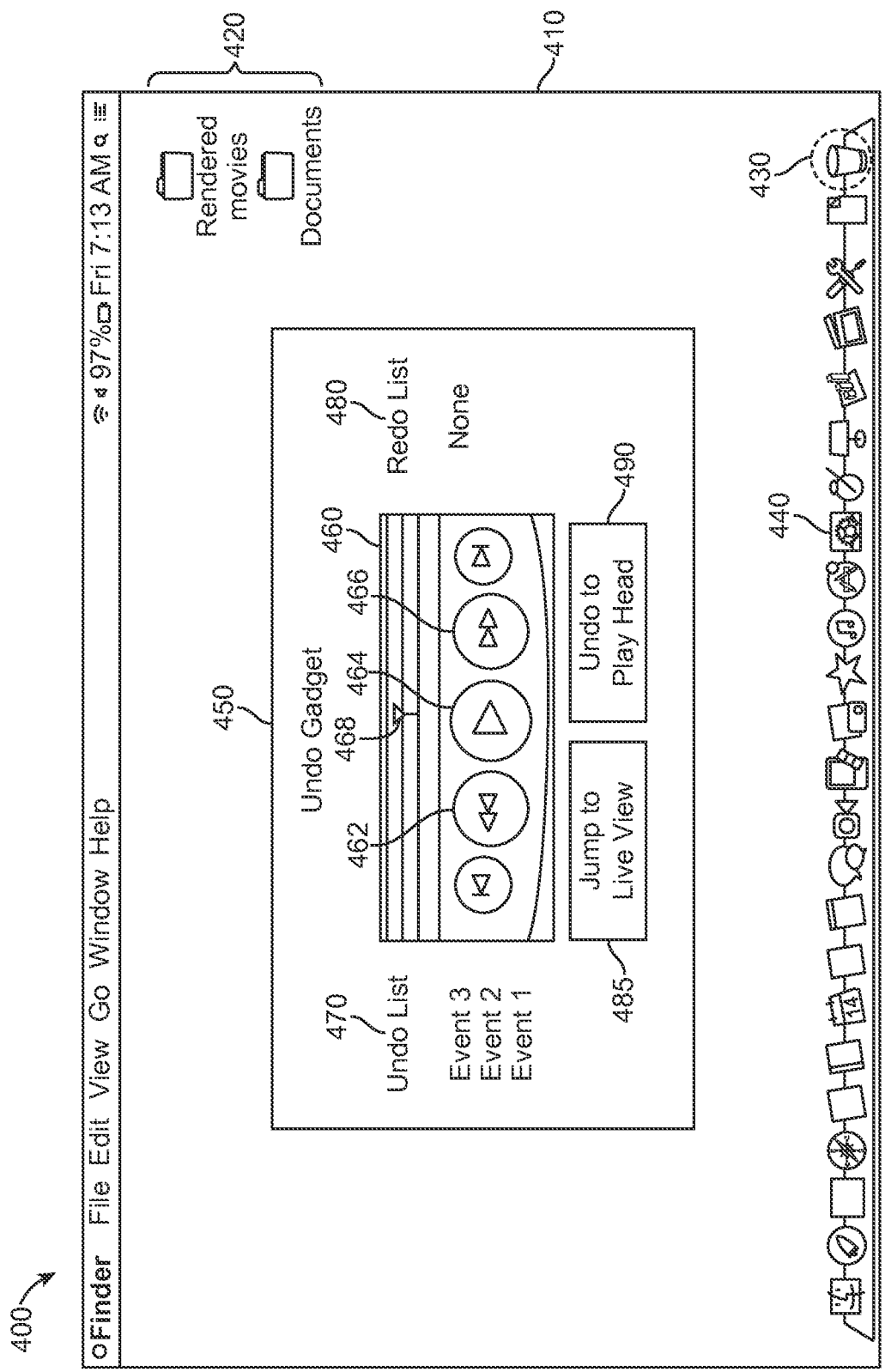
FIG. 4 illustrates an undo user interface according to an embodiment of the present invention.

Undo subsystem 155 can also include undo user interface (UI) module 170 for generating a user interface to be presented on display 125. The user interface can enable a user to see a next event to be undone in a system, initiate an undo operation, and visually observe the undo operation that is animated in reverse order of the events as they were originally received. An example of a user interface is shown in FIG. 4 below.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by electronic device 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that functions as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user selects using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be, but need not be associated with, any particular array in display 125. Other user interfaces can also be implemented.

Network interface 135 can provide voice and/or data communication capability for electronic device 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of electronic device 100. For example, bus 140 can communicatively couple processing unit(s) 105 with storage subsystem 110. Bus 140 also connects to input devices 120 and display 125. Bus 140 also couples electronic device 100 to a network through network interface 135. In this manner, electronic device 100 can be a part of a network of multiple computer systems (e.g., a local area network (LAN), a wide area network (WAN), an Intranet, or a network of networks, such as the Internet. Any or all components of electronic device 100 can be used in conjunction with the invention.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for electronic device 100. For example, processing unit(s) 105 can execute a word processing application, spreadsheet application, file manager application, or a browser application—to name a few examples.

It will be appreciated that computer system 100 is illustrative and that variations and modifications are possible. Embodiments of the present invention can be realized using any combination of dedicated components and/or programmable processors and/or other programmable devices. Computer system 100 can have other capabilities not specifically described here (e.g., mobile phone, global positioning system (GPS), power management, one or more cameras, various connection ports for connecting external devices or accessories, etc.).

Further, while computer system 100 is described with reference to particular blocks, it is to be understood that these blocks are defined for convenience of description and are not intended to imply a particular physical arrangement of component parts. Further, the blocks need not correspond to physically distinct components. For example, various processes described herein can be implemented on the same processor or different processors in any combination. Blocks can be configured to perform various operations, e.g., by programming a processor or providing appropriate control circuitry, and various blocks might or might not be reconfigurable depending on how the initial configuration is obtained. Where components are described as being configured to perform certain operations, such configuration can be accomplished, e.g., by designing electronic circuits to perform the operation, by programming programmable electronic circuits (such as microprocessors) to perform the operation, or any combination thereof. Embodiments of the present invention can be realized in a variety of apparatus including electronic devices implemented using any combination of circuitry and software. Further, while the embodiments described above may make reference to specific hardware and software components, those skilled in the art will appreciate that different combinations of hardware and/or software components may also be used and that particular operations described as being implemented in hardware might also be implemented in software or vice versa.

II. Method for Undo Operation

Figure 2:
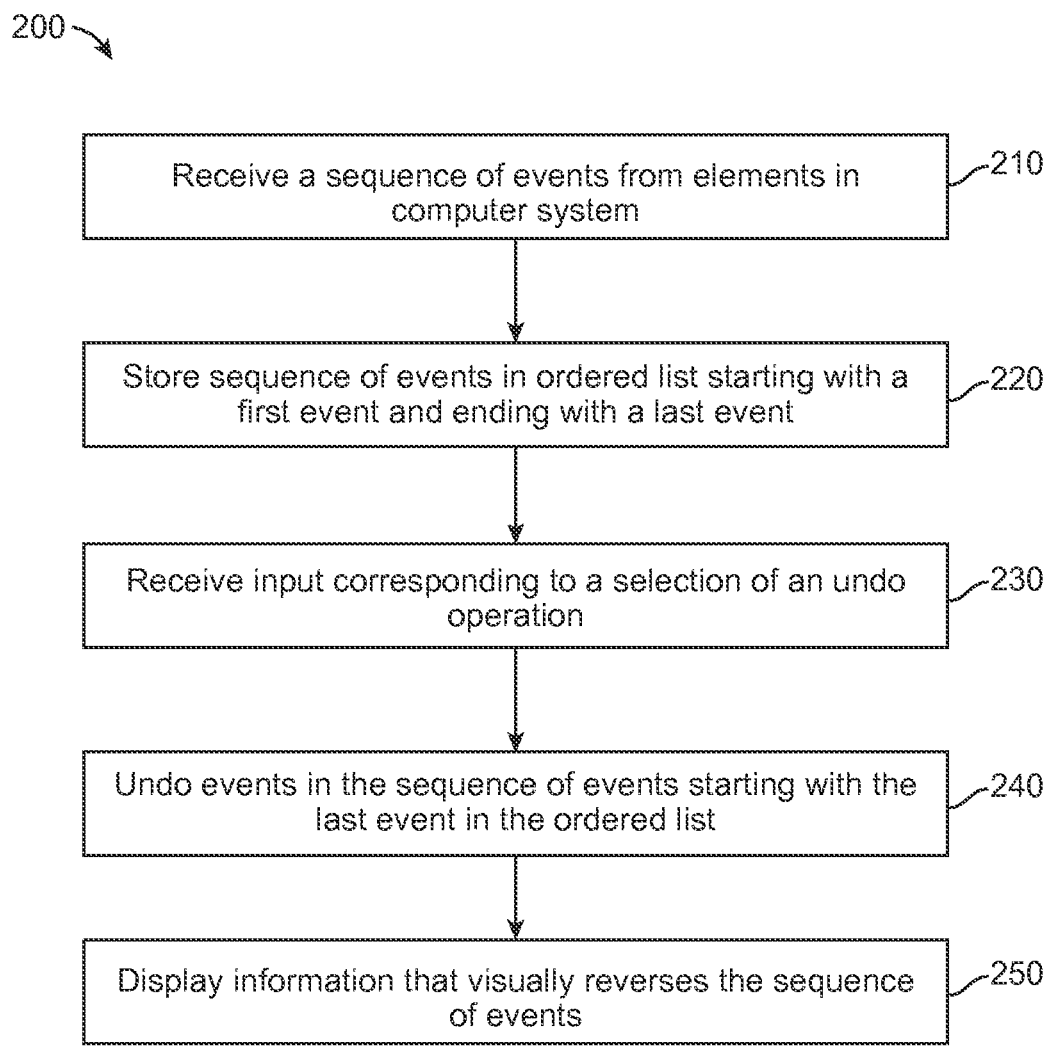
FIG. 2 is a high-level flow diagram performed by a computer system for an undo operation according to an embodiment of the present invention.

FIG. 2 is a high-level flow diagram performed by a computer system for an undo operation according to an embodiment of the present invention. At block 210, a computer system receives a sequence of events from elements in computer system. In some embodiments, the sequence of events is received as user input. For example, the sequence of events can include creating a word processing document, editing the word processing document, opening a spreadsheet, editing the spreadsheet document, closing the word processing document, moving a photo from a first location to a second location, and then emailing the photo. In some embodiments, the sequence of events can be received without user input. For example, the sequence of events could be content displayed in a web browser (e.g., video or animated content that can be displayed independent of user input), or receiving a push notification or email.

At block 220, the computer system stores the sequence of events in an ordered list. The ordered list can include the sequence of events as it occurred in time starting with the first event and ending with the last event. In some embodiments, the ordered list can be implemented as a stack. For example, the computer system can store a first event received at a first time, followed by a second event received at a second, later time, and so on, until the computer system stores a last event that occurs at an even later time. In some embodiments, the list has a predetermined size such that the list has a maximum number of events that can be stored in the ordered list. In such instances, the earliest event or events may be discarded in favor of newer events. In some embodiments, the list has a variable size dependent on the size of the undo data.

At block 230, the computer system receives input corresponding to a selection of an undo operation. In some embodiments, the input is received via a user interface, such as the example user interface illustrated in FIG. 4. In some embodiments, the input is received from a keyboard, mouse, microphone, touchpad, touchscreen, motion sensor, or other user input mechanism. At the time the undo input it received, the event stored immediately prior to the undo input can be referred to as the last event. The last event can be the first event undone.

At block 240, the computer system performs an undo operation by undoing events in the sequence of events. In some embodiments, the undo operation starts with the last event in the ordered list and undoes that operation. In some embodiments, the event immediately preceding the last event in time can be the next event that is undone. Further undo operations can be performed on additional events in the list in the opposite order from which the events were received. That is, the events are undone in a last in, first out order.

At block 250, the computer system can display information that visually reverses the sequence of events. In some embodiments, visually reversing the sequence of events includes an animation from the one event to the next event. In some embodiments, visually reversing the sequence of events includes changing the information displayed from graphical data associated with one event to graphical data associated with the event immediately preceding the one event. In some embodiments, the process of visually reversing the information displayed also undoes actions associated with received events. In some embodiments, visually reversing the information displayed can be done independent of the undo operation.

It will be appreciated that process 200 is illustrative and that variations and modifications are possible. Steps described as sequential may be executed in parallel, order of steps may be varied, and steps may be modified, combined, added or omitted. For instance, while FIG. 2 illustrates a particular order in which criteria can be applied, it is to be understood that any order can be used. For example, block 250 could be performed before block 240. That is, visually reversed information can be displayed before the events are undone.

III. Undo Stack

Figure 3:
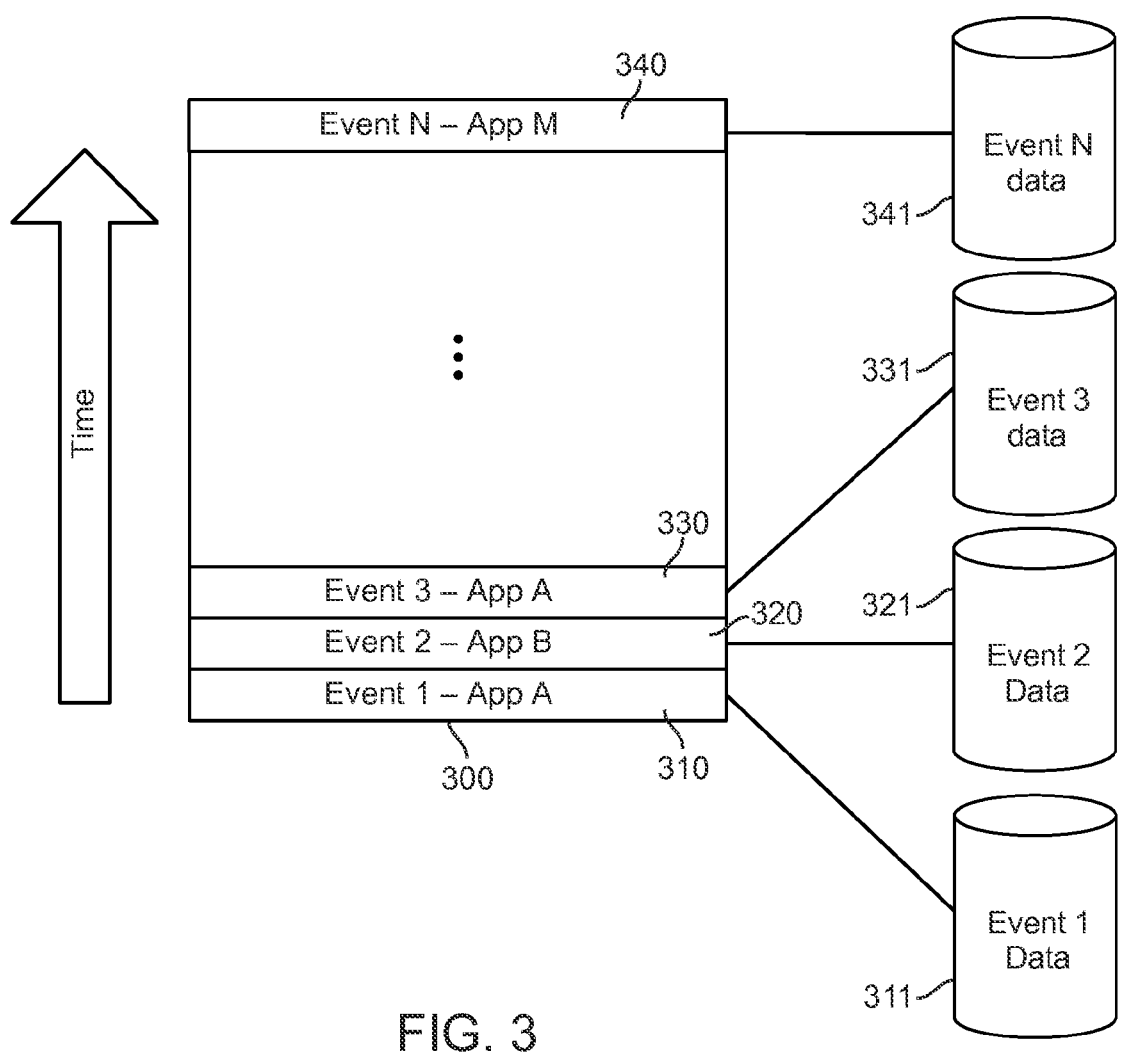
FIG. 3 illustrates an undo stack according to an embodiment of the present invention.

FIG. 3 illustrates an undo list according to an embodiment of the present invention. In some embodiments, an undo list is a simple ordered list with associated information. In some embodiments, an undo list can be implemented as a stack. The stack can have push and pop operation. In some embodiments, the relation between the push and pop operations is such that the stack is a Last-In-First-Out (LIFO) data structure. In a LIFO data structure, the last element added to the structure is the first one to be removed. In some embodiments, the stack has a threshold hold capacity. When the threshold capacity is met, items at the bottom of the stack can be removed. In some embodiments, the capacity of the stack is variable. In some embodiments, the stack capacity varies with available storage space.

As illustrated, undo stack 300 includes a first event 310, a second event 320, a third event 330, and an Nth event 340. The events in stack 300 are ordered in time. Event 310 is the oldest event in stack 300. Event 340 is the most recent event in stack 300.

In some embodiments, events can be associated with a system element from which the event was received. Events can be associated with an application that received the event. For example, event 310 is associated with Application A, event 2 is associated with Application B, event 330 is associated with Application C, and event 340 can be associated with Application M.

In some embodiments, the association between events and systems elements can be made in the list. In some embodiments, data can be associated with each of the events. Event 310 can be associated with data for the event (311). Likewise, events 320, 330, and 340 can be associated with data for each respective event (321, 331, and 341). Event data (311, 321, 331, and 341) can include visual data corresponding to the event. For example, event data 311 can include visual data corresponding to the event 310, such as an animation. The visual data corresponding to the event 310 can be used to animate, rewind, and play back the event on a display. Event data can also include an identifier for the system element that received the event, an event time, or other suitable information.

Upon receipt of an undo input, the events can be undone by beginning with the last event in the ordered list, where the last event occurred most recently in time. For example, upon receipt of an undo input, event 340 would be undone. Visual data associated with event 340 (e.g., stored in event data 341) can be displayed.

IV. Interactive Undo User Interface

FIG. 4 illustrates an undo user interface 400 according to an embodiment of the present invention. Undo user interface 400 can include a desktop environment 410 including various system elements such as folders 420, graphical elements 430 corresponding to applications/functions, application launch menu 440, and the like. Undo user interface 400 can include an interactive element, such as an undo gadget 450, an undo list 470, a redo list 480, a live view button 485, an undo to play head button 490, and/or other suitable graphical user interface elements.

Undo gadget 450 can include a user interface for providing an undo input 460. In some embodiments, undo input 460 is presented as a media player metaphor. The media player metaphor is something that users understand well and can include an undo rewind button 462, an undo play button 464, and/or an undo fast-forward button 466. The media player metaphor can include other elements that are not specifically shown; for example, a pause button. Undo rewind button 462 can receive a user input to initiate an undo process. Upon receipt of the input, the computer system can rewind and display the information that was previously shown on the display. Additionally, the computer system can undo operations that were associated with the information that was previously shown on the display.

In some embodiments, the undo play button 464 can be selected after an undo rewind button 462 causes the display to display the information that was previously shown on the display (e.g., a display of information associated with a prior event in system). Upon activating undo play button 464, the display can show a replay of the events that were received by the computer system in chronological order. This is beneficial because it can jog the user's memory as to what events occurred in the system and can help the user identify a specific event to undo. The media player metaphor can include a pause button for pausing the undo rewind, or undo replay, or can include a similar button.

The media player metaphor can include a play head 468 on a timeline. Play head 468 can indicate how far back in time the undo rewind operation has gone. Play head 468 could also include information that indicates to a user the size of the undo rewind buffer (e.g., how far the user can rewind in time). In some embodiments, the size of the rewind buffer is dependent on available memory and/or the types of events that are recorded by the system. For example, some events may be more computationally intensive or use lots of memory (e.g., playing a full screen game might reduce the length of the timeline available for rewind because of the intensity of the process).

In some embodiments, certain events cannot be undone. For example, typically, if a user sends an email, this action cannot be undone once the email has been transmitted. In some embodiments, when an event cannot be undone, the undo stack resets (removes all events in the undo list). For example, a temporary heads up display could inform the user that the undo stack/buffer has been reset. In some embodiments, when an event cannot be undone, the undoable event is flagged in the stack. If the user attempts to undo the flagged event, a display can inform that user that the flagged event is not an undoable action. In some embodiments, the user can rewind past the flagged event. In some embodiments, if the user rewinds past the flagged event, visual data associated with the flagged event can be removed from the "movie" to avoid confusion. In some embodiments, the visual data associated with the flagged event can be replaced with a warning or prompt to the user.

Undo list 470 can indicate one or more next events to be undone. For example, as illustrated, event 3 is the next event to be undone, event 2 is the next such event, and event 1 is the last event to be undone. In some embodiments, one or more events may have been undone. Events that have been undone can be redone by a redo operation. In some embodiments, redo list 480 contains a list of events that will be redone upon receipt of a redo user input.

In some embodiments, live view button 485 can be used to jump back to the "live view" or current system state. For example, a user might rewind the events 10 minutes (e.g., using the undo rewind button 462) in order to recall what changes were made to elements of the system. After recalling the changes, the user decides that she does not want to undo any of the events. Or, after recalling the changes, the user can identify one or more events that the user would like to undo. For example, the user may want to undo an action that is in the middle of the list, but not other actions. Live view 485 button can be used to return to the state immediately before activating the undo rewind button.

In some embodiments, undo to play head button 490 can be used to undo events that occurred subsequent to the play head position while leaving events that occurred before the play head position intact. For example, a user might rewind the events 10 minutes (e.g., using the undo rewind button 462) in order to recall what changes were made to elements of the system. After recalling the changes, the user might decide that she wants to undo events that occurred in the last 5 minutes. Using play head 468, the user can position the play head at the desired position and activate the undo to play head 490 button.

V. Undo Stack Generation

FIGS. 5-16 illustrate a user interface of a computer system and an undo stack in various stages of an undo process. Specifically, FIGS. 5-16 show a series of screenshots in chronological order. The screenshots are intended to illustrate various events can be received by the computer system. In response to receiving various event, the computer system can generate an undo stack, such as stack 300 in FIG. 3. These figures are exemplary in nature and one having skill in the art will recognize that, for clarity, not every step is included and modifications can be made without departing from the scope of the present invention.

Figure 5:
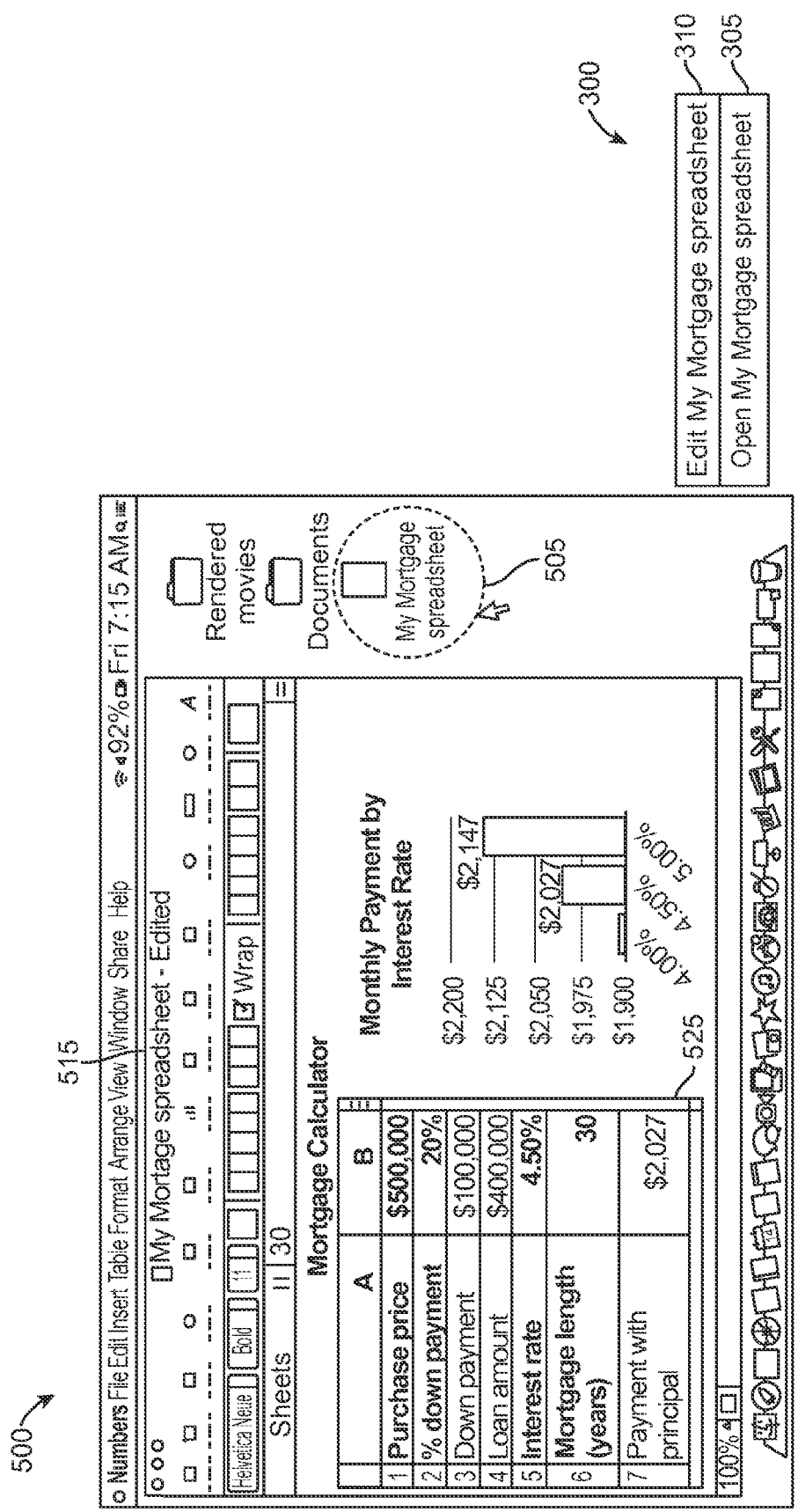
FIGS. 5-16 illustrate a user interface of a computer system and building an undo stack in various stages of an undo process.

FIG. 5 illustrates a first user interface 500 and state of stack 300 according to an embodiment of the present invention. The computer system can receive any number of events, including user input from a mouse, keyboard, touch display, or the like. For example, a file can be generated in a desktop user interface environment, and an icon can be positioned on the desktop (e.g., "My Mortgage spreadsheet" icon 505). As illustrated, an element of the computer system can receive an input to open a file located on the computer system when icon 505 is selected. Specifically, a file manager element receives an input to open a file.

Responsive to receiving the input, the computer system can open an application associated with the file (e.g., a spreadsheet application 515) and/or the file. The opening of the application associated with the file is an example of an event that is logged by the computer system. Other events could include the position of a cursor over time. In some embodiments, these events could be incorporated along with other events (e.g., the movement of the mouse prior to the opening of the application can be considered part of the opening event). Stack 300 can be updated to reflect the event of opening the "My Mortgage spreadsheet." For example, stack 300 can be updated to contain an entry 305 in the stack corresponding to the opening of the "My Mortgage spreadsheet." At this point in time, event entry 305 is the last event to occur in time.

As described with reference to FIG. 3, stack entry for event 305 can include data associated with event 305. For example, the movement of a cursor within the user interface can be stored as event data. One or more animations associated with the opening of the application can be stored as event data. Event data can include visual data that can be used to visually reverse one or more of the events from the sequence of events in the stack in response to an undo operation input. For example, the selection of icon 505 can involve an input device that causes a cursor (or the like) to move on the display screen and select the icon 505. In some embodiments, visual data representative of that movement can be stored as event data.

Content can be added, deleted, or otherwise modified in many applications, such as spreadsheet application 515.

Responsive to receiving input to modify content within an application, stack 300 can be updated to reflect the modifications. For example, stack 300 can be updated to contain an entry 310 in the stack corresponding to the editing of the "My Mortgage spreadsheet." Again, stack entry for event 310 can include data, such as visual data, associated with event 310. In the illustration shown, a user could have modified the mortgage calculator cells from default values to the values shown in the cells 525. Each user input (e.g., cursor movement and data entry/modification) can be an event and can have event data associated with the event, including visual data.

Figure 6:
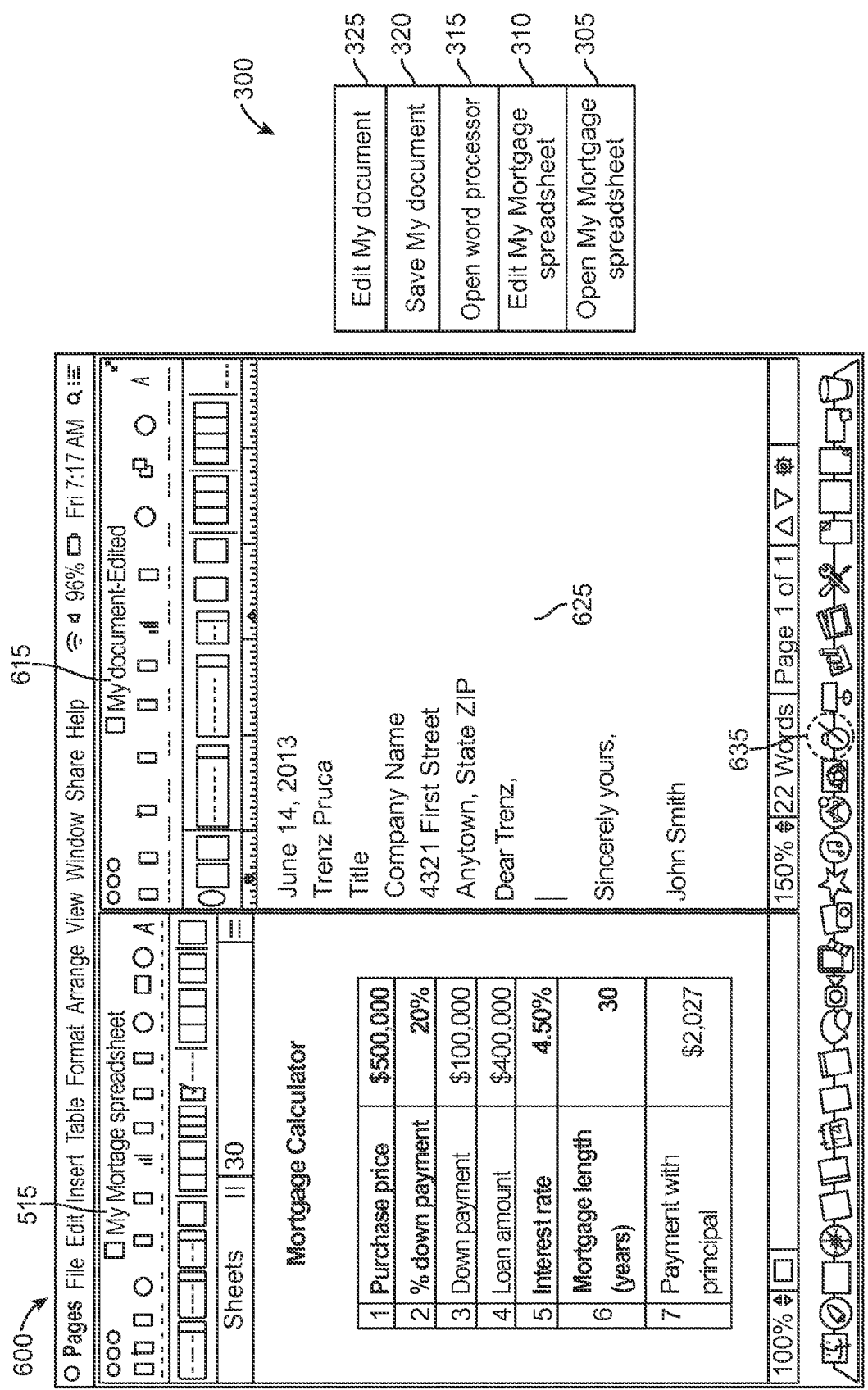

FIG. 6 illustrates a second user interface 600 and state of a stack 300, subsequent to FIG. 5, according to an embodiment of the present invention. For example, events are received by the computing system, including opening a word processor, creating and saving "My Document," and editing "My Document."

The word processing application can be opened by selecting an icon 635 associated with a word processing application. Undo stack 300 can be updated to reflect this event by adding an entry 315 after the previous event recorded (310). Event data, including visual data associated with the event, can be linked to event record 315 in stack 300. For example, the visual data may include the info displayed as a user uses a mouse to launch the word processing application (e.g., by clicking icon 635).

The word processing document "My Document" can be saved in a conventional manner using a user interface of the word processing application 615. Undo stack 300 can be updated to reflect this event by adding an event entry 320 after the previous event recorded (315). Event data, including visual data associated with the event, can be linked to event record 320 in stack 300. For example, visual data representing information displayed on a screen when a user uses a mouse to select "File" and "Save As" can be stored and linked to event record 320.

The word processing document "My Document" can be edited by adding, removing, or modifying the content in the document (625). Undo stack 300 can be updated to reflect the editing event by adding an event entry 325 after the previous event recorded (320). Event data, including visual data associated with the event, can be linked to event record 320 in stack 300. For example, visual data associated with the content that was added, removed, or modified can be stored. The visual data can include data about the content, such as the speed at which the content was entered and/or manipulated. For example, the speed of the typing or speed of the mouse movement can be included in the event data and/or visual data.

Figure 7:
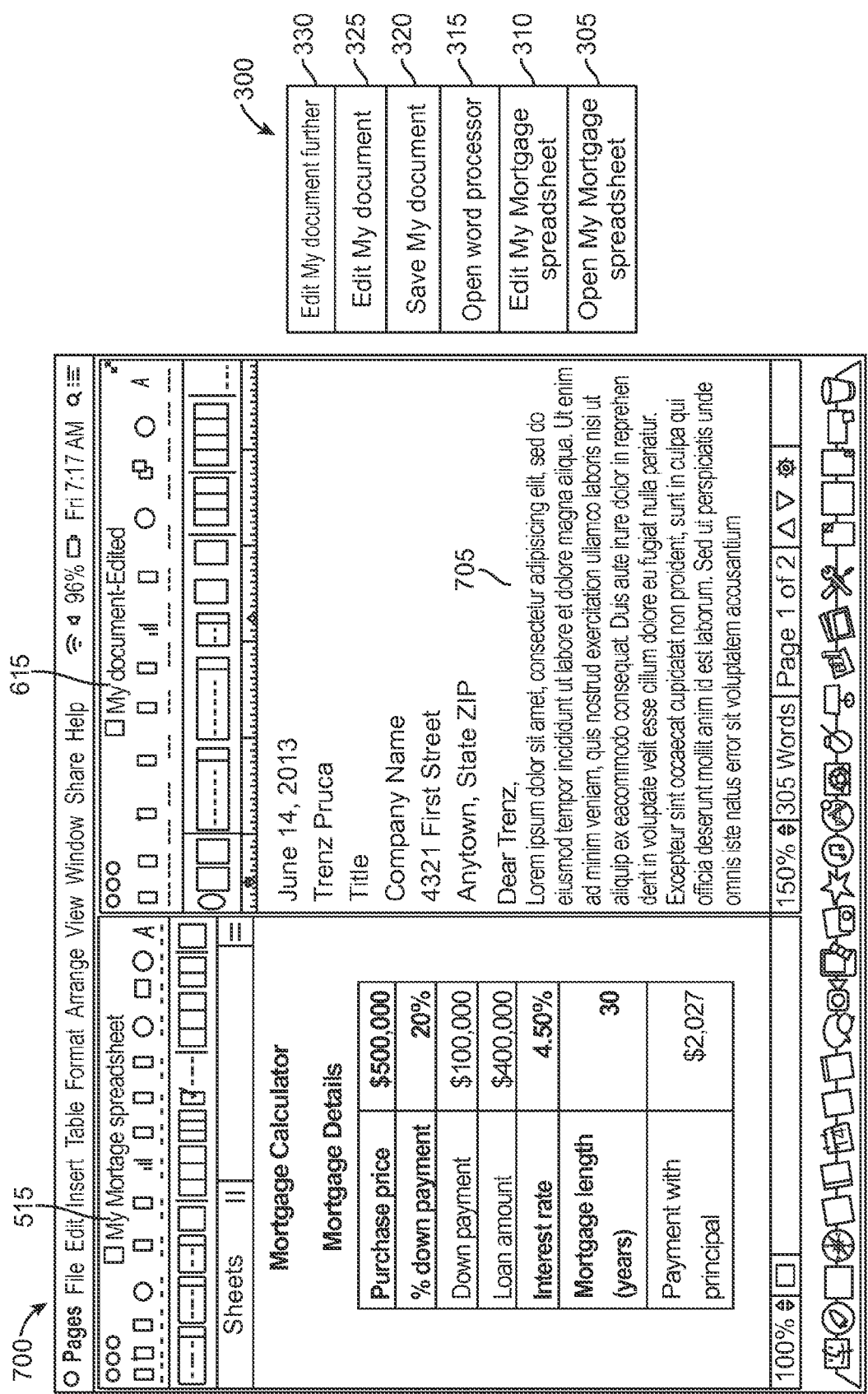

FIG. 7 illustrates a third user interface 700 and state of stack 300, subsequent to FIG. 6, according to an embodiment of the present invention. The word processing document "My Document" can be further edited by adding, removing, or modifying the content in the document (705). Undo stack 300 can be updated to reflect the editing event by adding an event entry 330 after the previous event recorded (325). Event data, such as the further modifications to the document and the speed/timing of the modification, can be linked to event record 330 in stack 300.

As illustrated, text 705 has been added to the document. In some embodiments, visual data can include the order in which this text was added to the document and/or modified. In some embodiments, visual data can include the speed or timing at which text was added to the document and/or modified.

Figure 8:
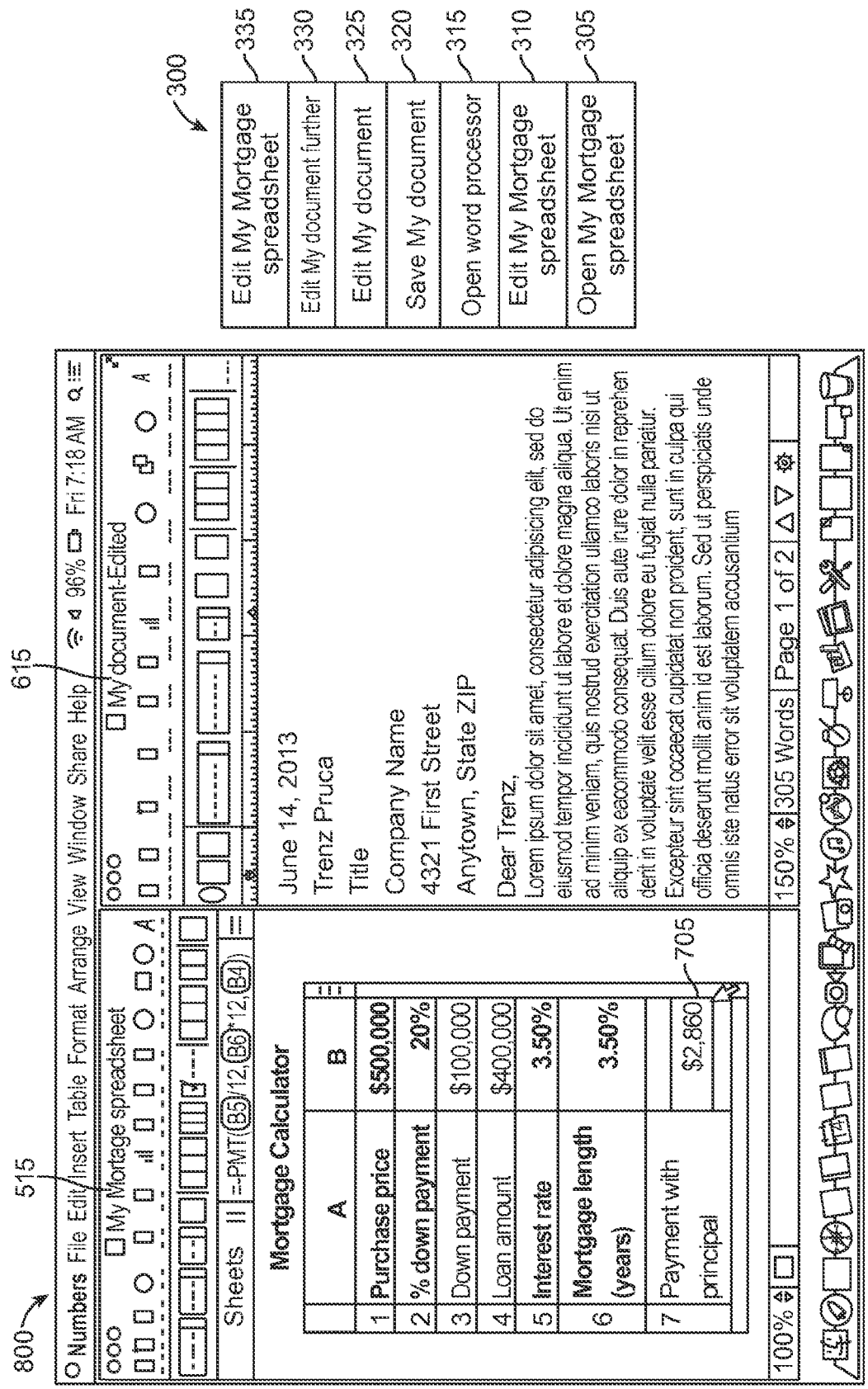

FIG. 8 illustrates a fourth user interface 800 and state of stack 300, subsequent to FIG. 7, according to an embodiment of the present invention. The spreadsheet "My Mortgage spreadsheet" can be modified by the user. For example, the user might select the spreadsheet application 515 as the active window with a cursor. Then, the user might change the values in the cells of the spreadsheet. For example, the user might change the interest rate and/or term of the loan to see how those variables impact her monthly payment (705). Each of these changes and modifications can be events that are stored in the stack and linked to event data.

Figure 9:
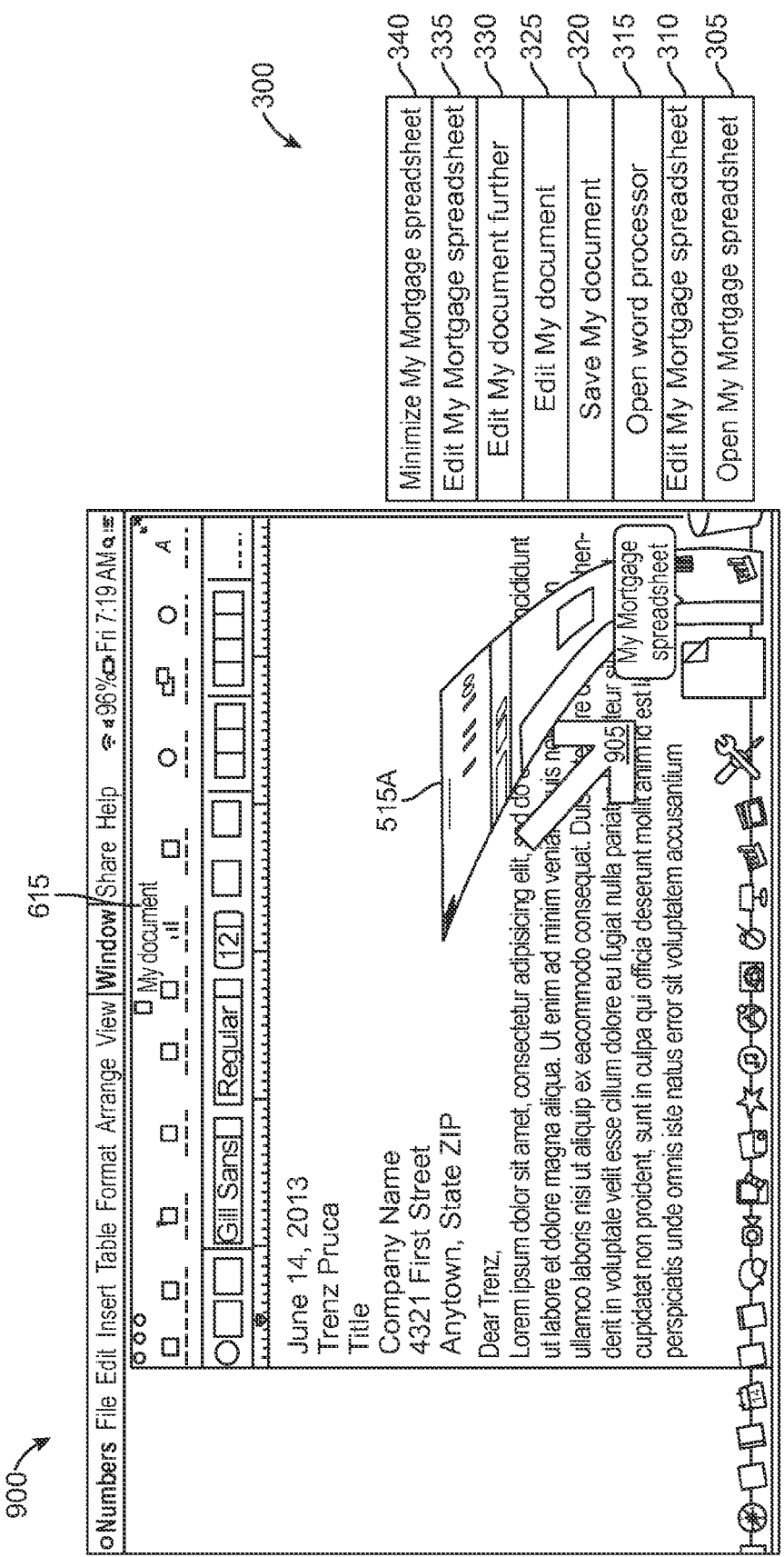

FIG. 9 illustrates a fifth user interface 900 and state of stack 300, subsequent to FIG. 8, according to an embodiment of the present invention. The spreadsheet application can be minimized. Responsive to receiving an event associated with minimizing an application, the computer system can minimize the application window. Undo stack 300 can be updated to reflect the minimizing event by adding an event entry 340 after the previous event recorded (335).

In some embodiments, the minimizing of a window may include an animation. As shown by arrow 905, when the spreadsheet "My Mortgage spreadsheet" is minimized, an animation (shown in intermediate state 515A), showing the progress from fully opened to minimized, can be displayed on a display. When an animation accompanies the minimizing of a window, the animation can be stored as visual data associated with the event of minimizing the application. This animation, for example, can be reversed in response to an undo user input. In some embodiments, the window may simply disappear. In this event, the visual data may simply include visual data for when the application window was fully opened to when the application window was minimized.

Figure 10:
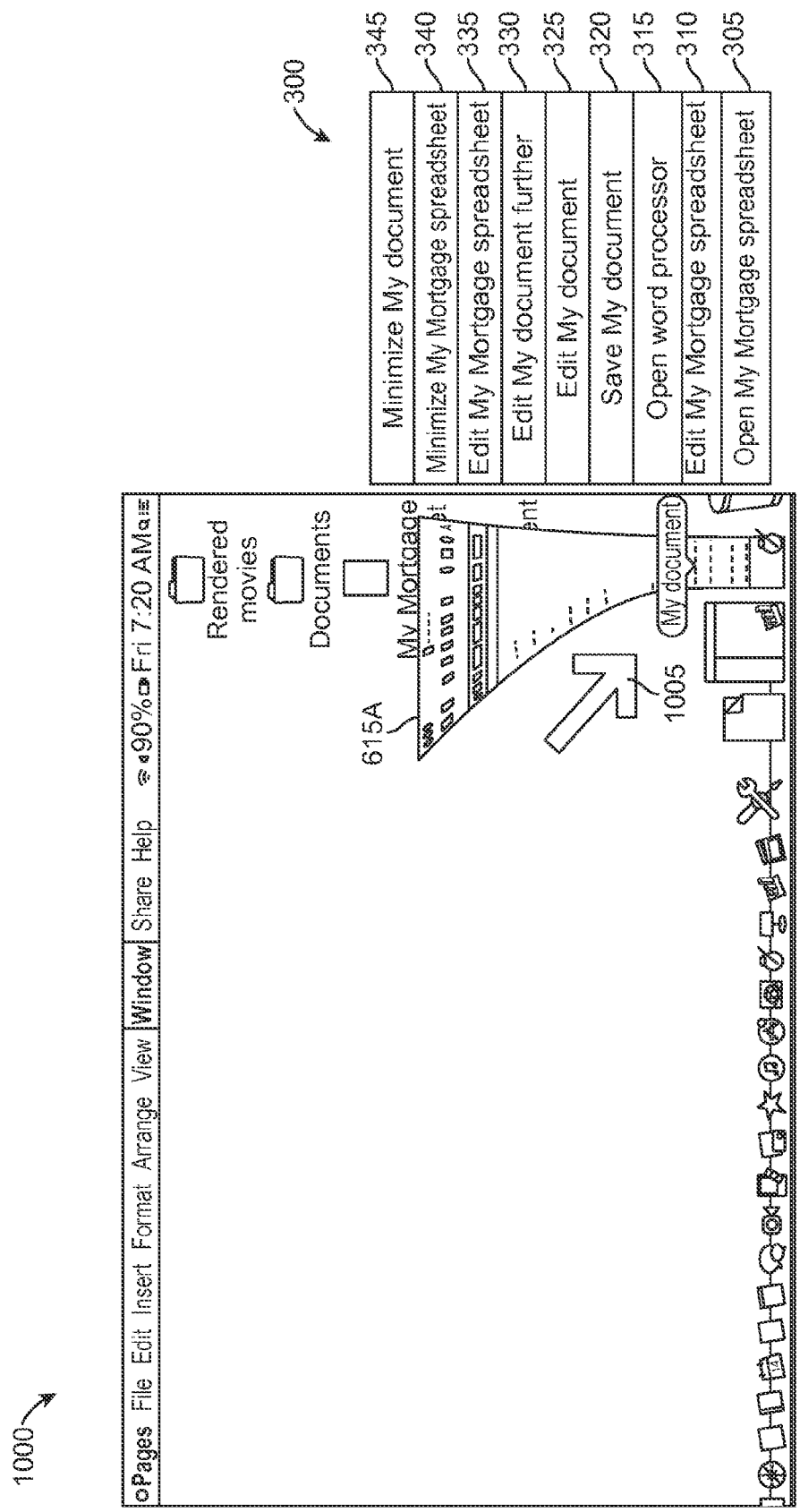

FIG. 10 illustrates a sixth user interface 1000 and state of stack 300, subsequent to FIG. 9, according to an embodiment of the present invention. The word processing application can be minimized. Responsive to receiving an event associated with minimizing an application, the computer system can minimize the application window. Undo stack 300 can be updated to reflect the minimizing event by adding an event entry 345 after the previous event recorded (340). Like the minimizing of the spreadsheet 515A, minimizing the word processing application 615A can include one or more animations that can be stored as visual data associated with the event. Arrow 1005 shows the direction of a minimization animation that can occur responsive to an input to minimize an application.

Figure 11:
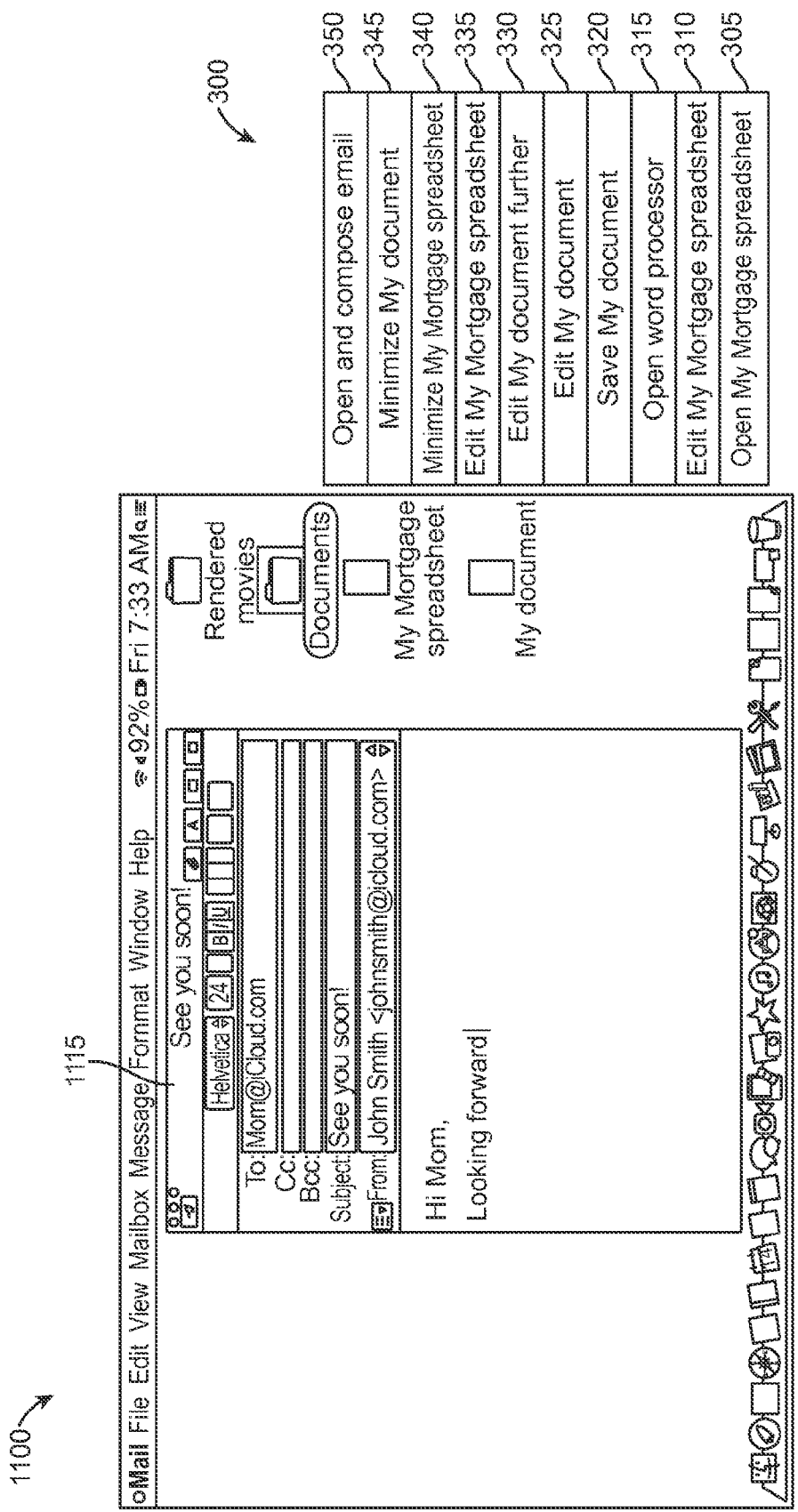

FIG. 11 illustrates a seventh user interface 1100 and state of stack 300, subsequent to FIG. 10, according to an embodiment of the present invention. An email application 1115 can be launched or opened as described above. The opening of the email application can be an event. Email application 1115 can receive events in the computer system. For example, the email application receives user input corresponding to an email. The order in which content is added, modified, and/or deleted can be logged. For example, the user might enter "Dear Mom," then delete "Dear Mom," and then enter "Hi Mom." Each of these can be events received from the system element and added to the undo stack and/or linked to event data. Undo stack 300 can be updated to reflect the opening of the email application and composing of an email by adding an event entry 350 after the previous event recorded (345). Visual data associated with the event can be associated with the event.

Figure 12:
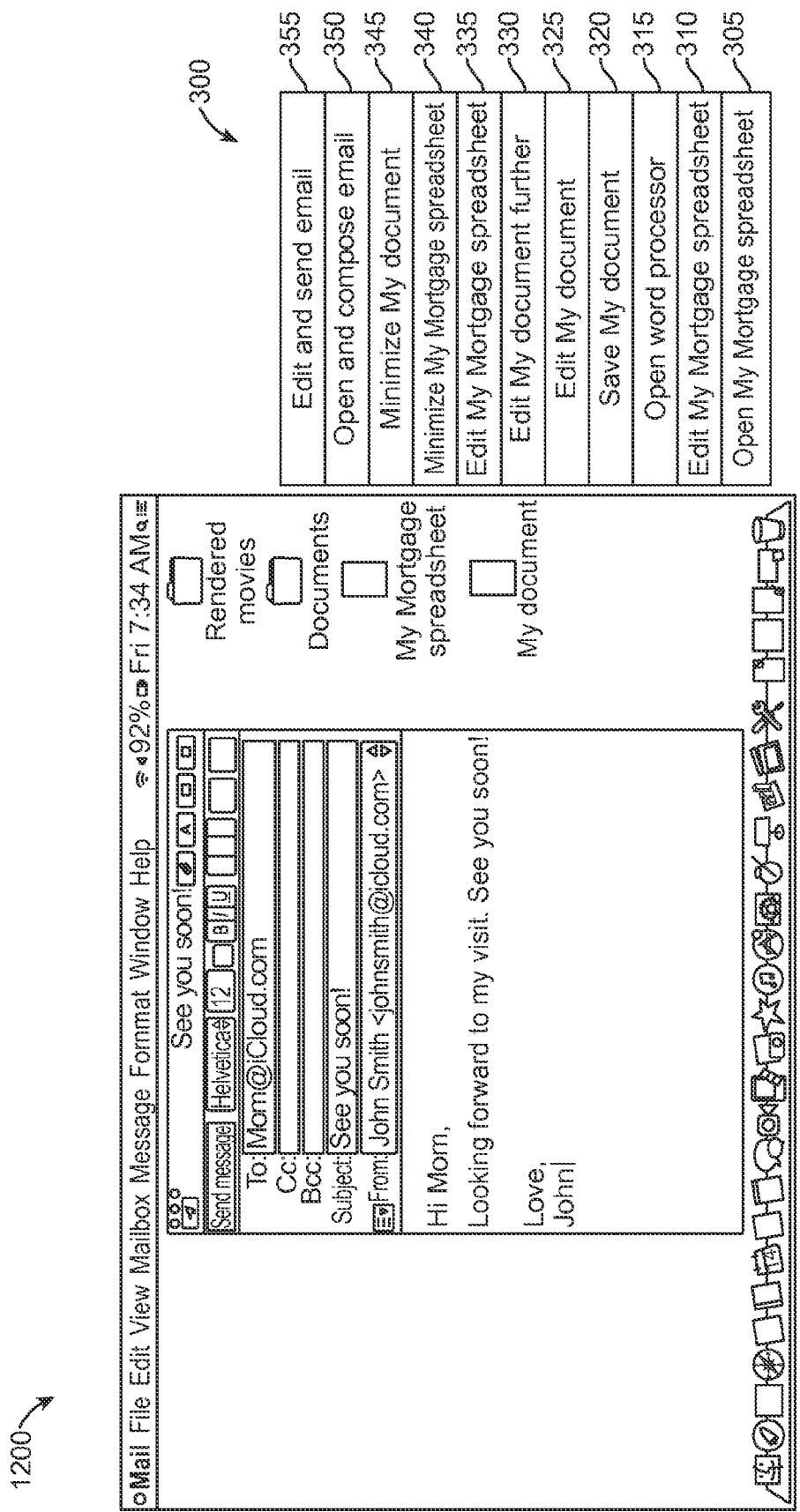

FIG. 12 illustrates an eighth user interface 1200 and state of stack 300, subsequent to FIG. 11, according to an embodiment of the present invention. An email application 1115 can be used to finish composing an email and sending an email. Then, the user can click "Send" to transmit the email from the computer system to a recipient. Undo stack 300 can be updated to reflect the sending of the email by adding an event entry 355 after the previous event recorded (350).

In some embodiments, once the email is transmitted, the event of sending the email is not an action that can be undone. In some embodiments, actions that cannot be undone are flagged with a "no undo" indicator flag. The indicator can be used in the rewind process to display an alert or notification to a user that the event is not a capable of being undone.

Figure 13:
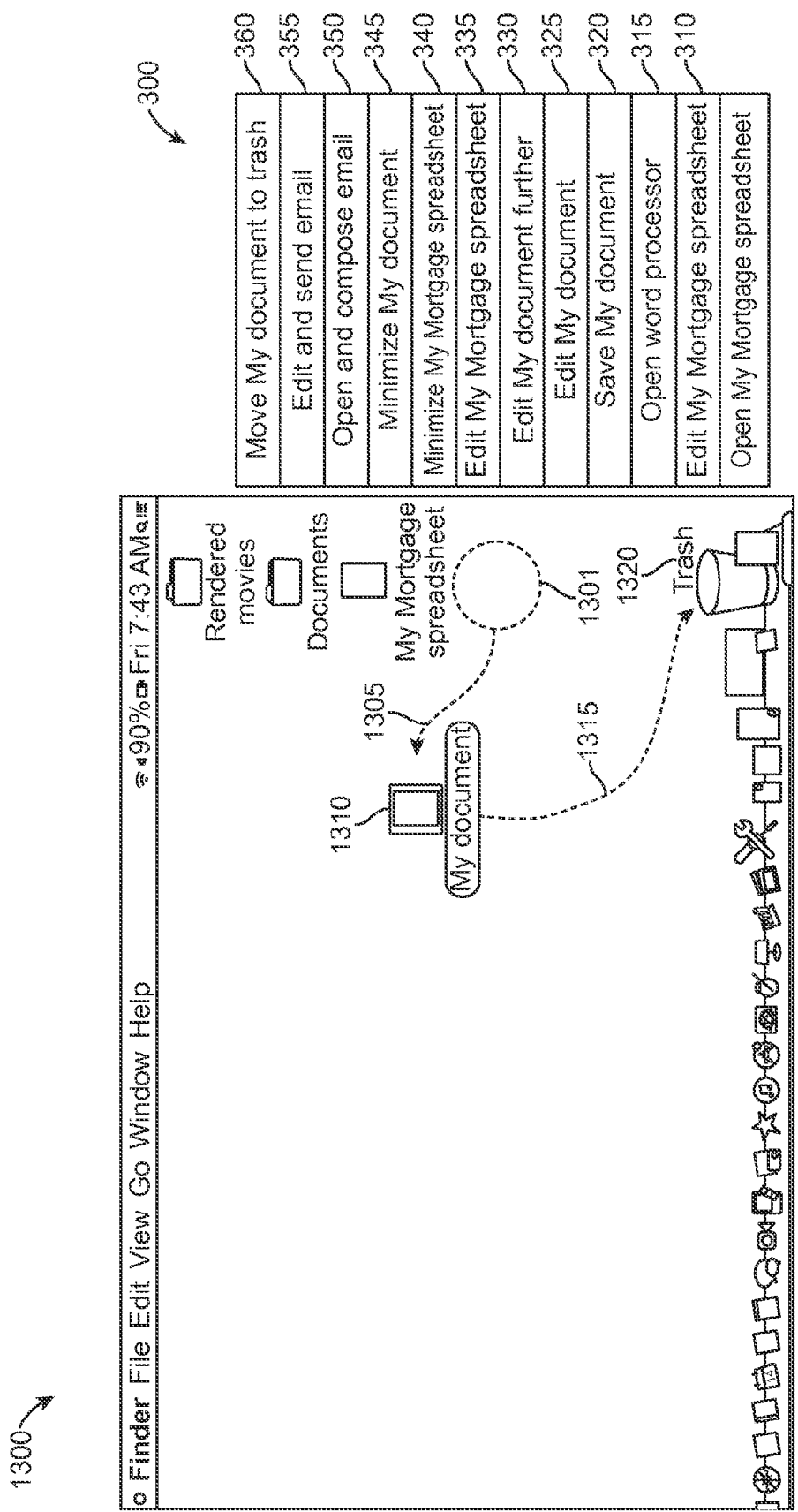

FIG. 13 illustrates a ninth user interface 1300 and state of stack 300, subsequent to FIG. 12, according to an embodiment of the present invention. User interface 1300 illustrates a file being moved to a different location. Specifically, the user interface includes a graphical element 1310 (or icon) associated with a file that is moved to trash 1320. The icon can have an initial position 1301 and can be moved in accordance with received input along paths 1305 and 1315. A path can start at a first location and end at a second location.

In some embodiments, the input to move an item can be an event that is received by elements of the system. Visual data associated with the information displayed as the icon 1310 is moved from initial position 1301 along path 1305 and path 1315 to the trash can 1320 location and can be stored and associated with the event.

In some embodiments, undo stack 300 can be updated to reflect the sending of the movement of a file from one location to another location by adding an event entry 360 after the previous event recorded (355). In some embodiments, intermediate movements from a first location to a second location can be an event that is received by elements of the system. For example, movement from the initial position 1301 to the position shown by icon 1310 along path 1305 can be an event, and movement from the position shown by icon 1310 along path 1315 to trash can 1320 can be a separate event. In some embodiments, the movement could be part of the same event (as shown).

Figure 14:
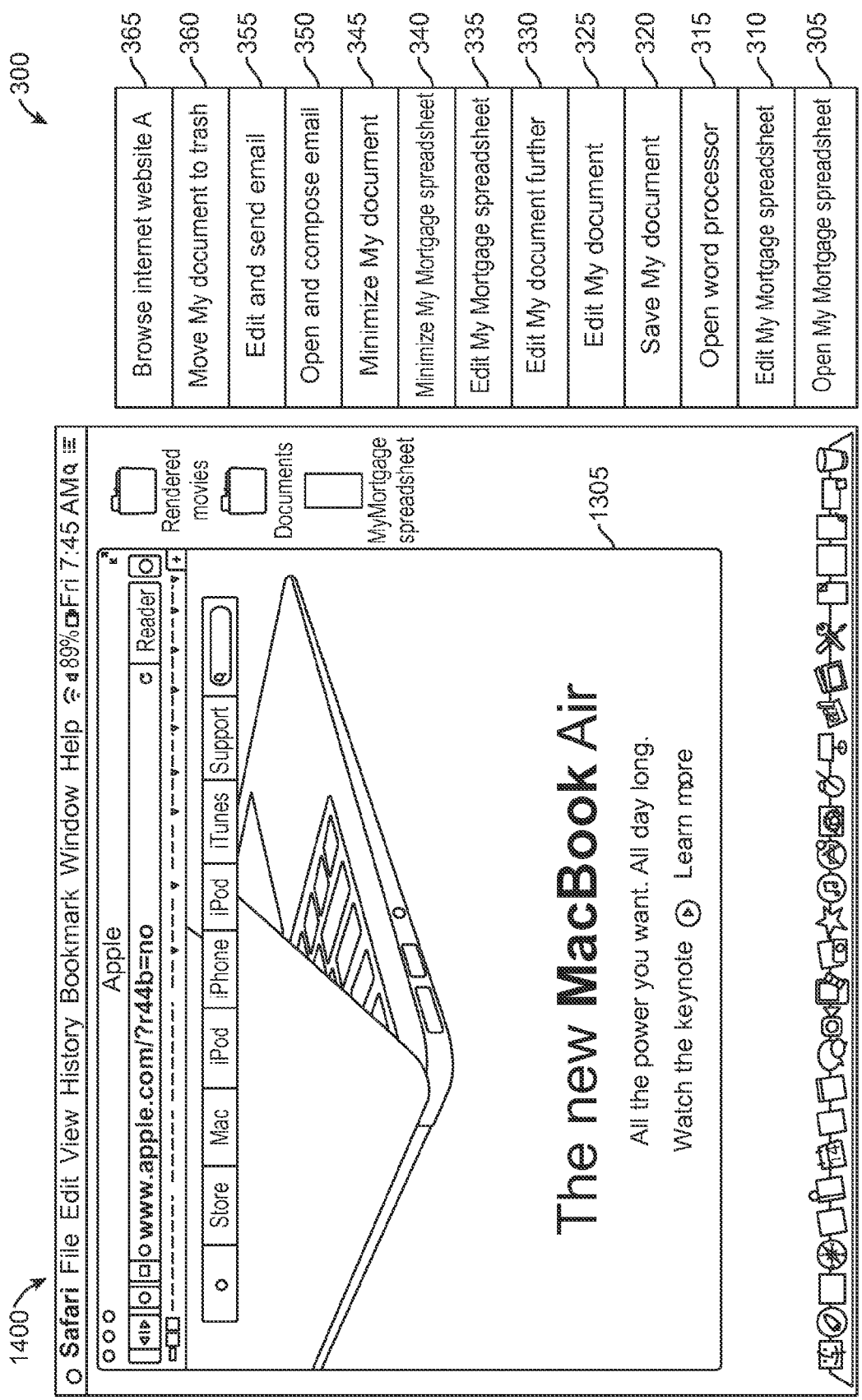

FIG. 14 illustrates a tenth user interface 1400 and state of stack 300, subsequent to FIG. 13, according to an embodiment of the present invention. A browser 1305 displays first web information in user interface 1400. Input can be received in the browser, for example, to follow links, go back, go to a specific web address, perform a search, and the like. Any changes in the displayed user interface 1400 can be events that are received by the computer system. For example, changes in the displayed user interface can include user input changes (e.g., movement of a cursor, keystrokes, scrolling, etc.) or output information displayed on the user interface (e.g., content from the web or system memory). Undo stack 300 can be updated to reflect the events in the web browser window by adding an event entry 365 after the previous event recorded (370). Visual data can be associated with the event entry 365.

Figure 15:
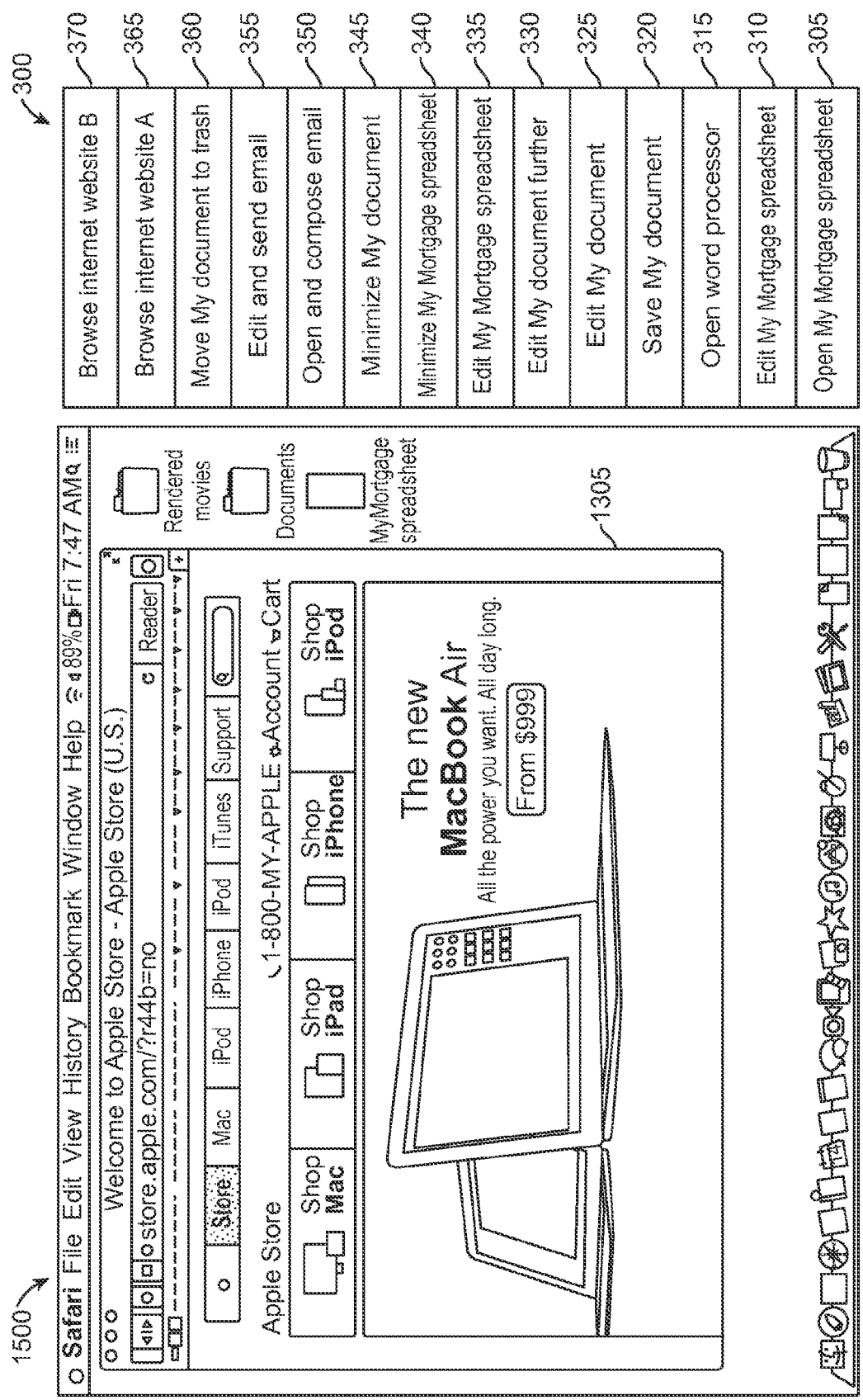

FIG. 15 illustrates an eleventh user interface 1500 and state of stack 300, subsequent to FIG. 14, according to an embodiment of the present invention. A browser 1305 displays second web information in user interface 1500. Undo stack 300 can be updated to reflect the events in the web browser window by adding an event entry 370 after the previous event recorded (365). Visual data can be associated with the event entry 370.

Visual data can include the information displayed during a transaction from first web information in user interface 1400 to second web information in user interface 1500. Visual data can also include user manipulation of first web information in user interface 1400 and second web information in user interface 1500, including scrolling, zooming in and out, highlighting, copying data to clipboard, or any other user action that can be initiated in a web browser.

FIGS. 5-15 are illustrative and variations and modifications are possible. Additionally, intermediate events and screenshots associated with those events are not shown for simplicity. The figures illustrate one example of receiving events in a user interface and generating an undo stack in accordance with some embodiments of the present invention. Once an undo stack is generated, an undo user input can be received.

VI. Undo Rewind

Figure 16:
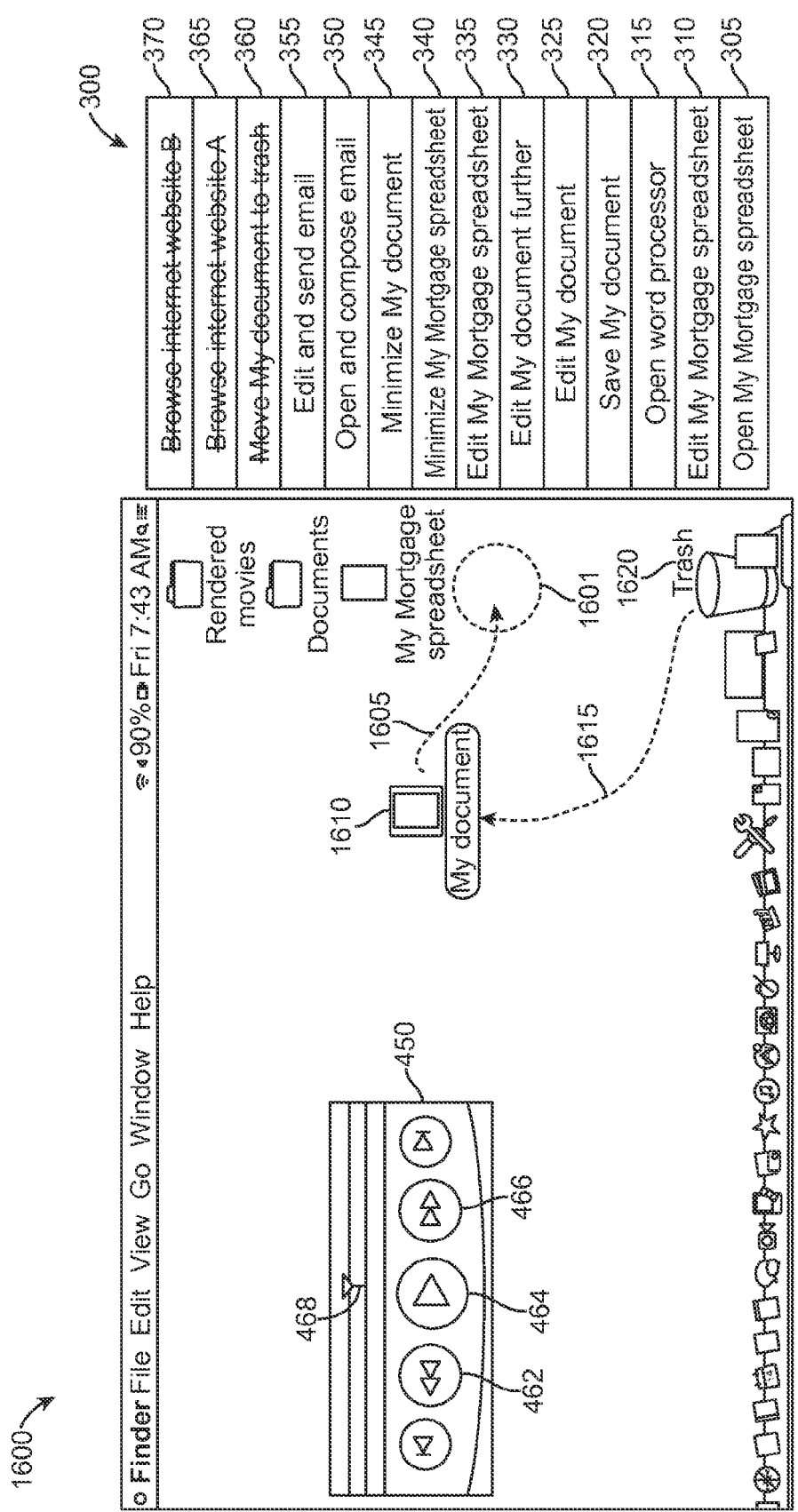
Figure 17:
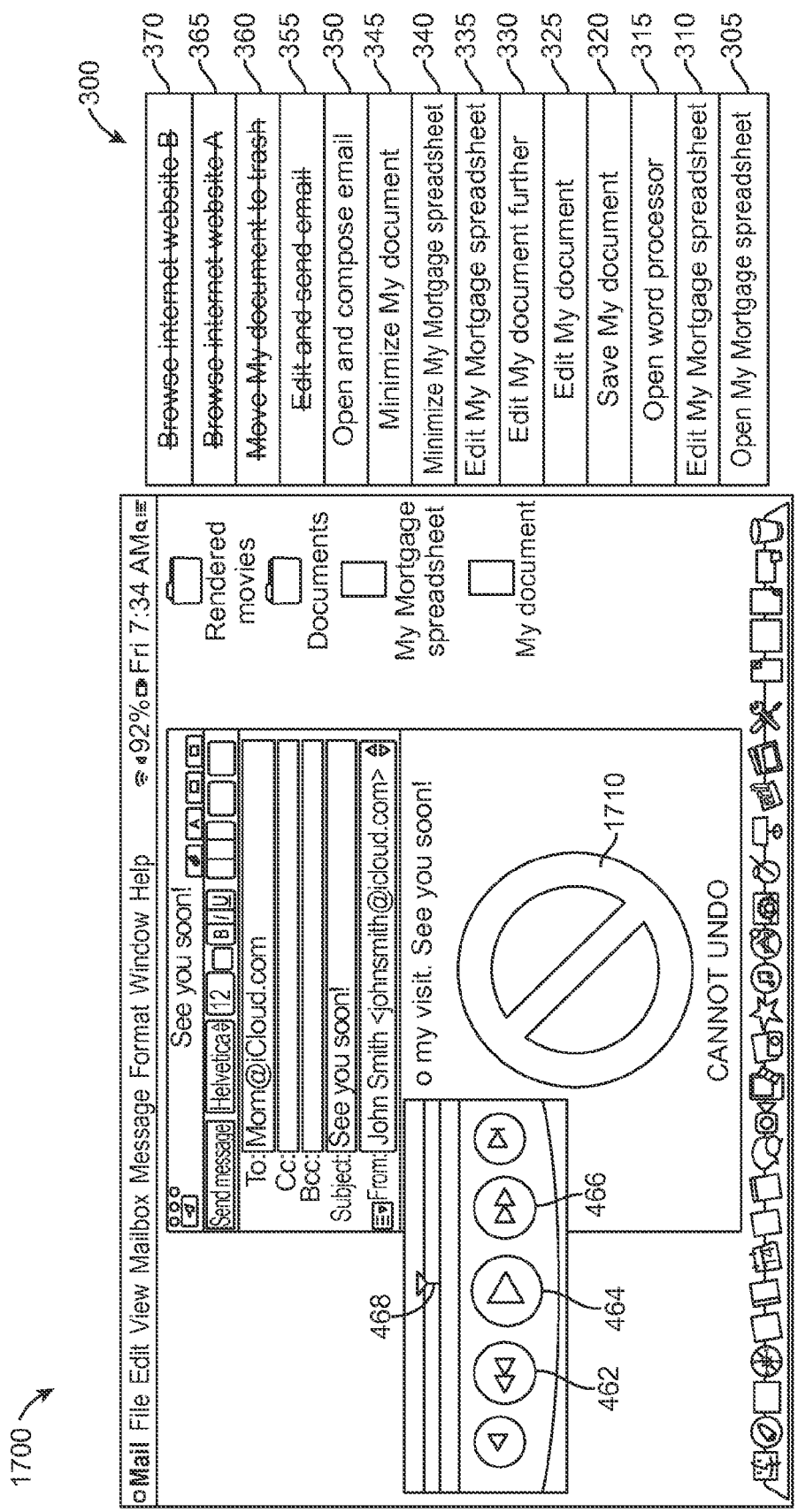
Figure 18:
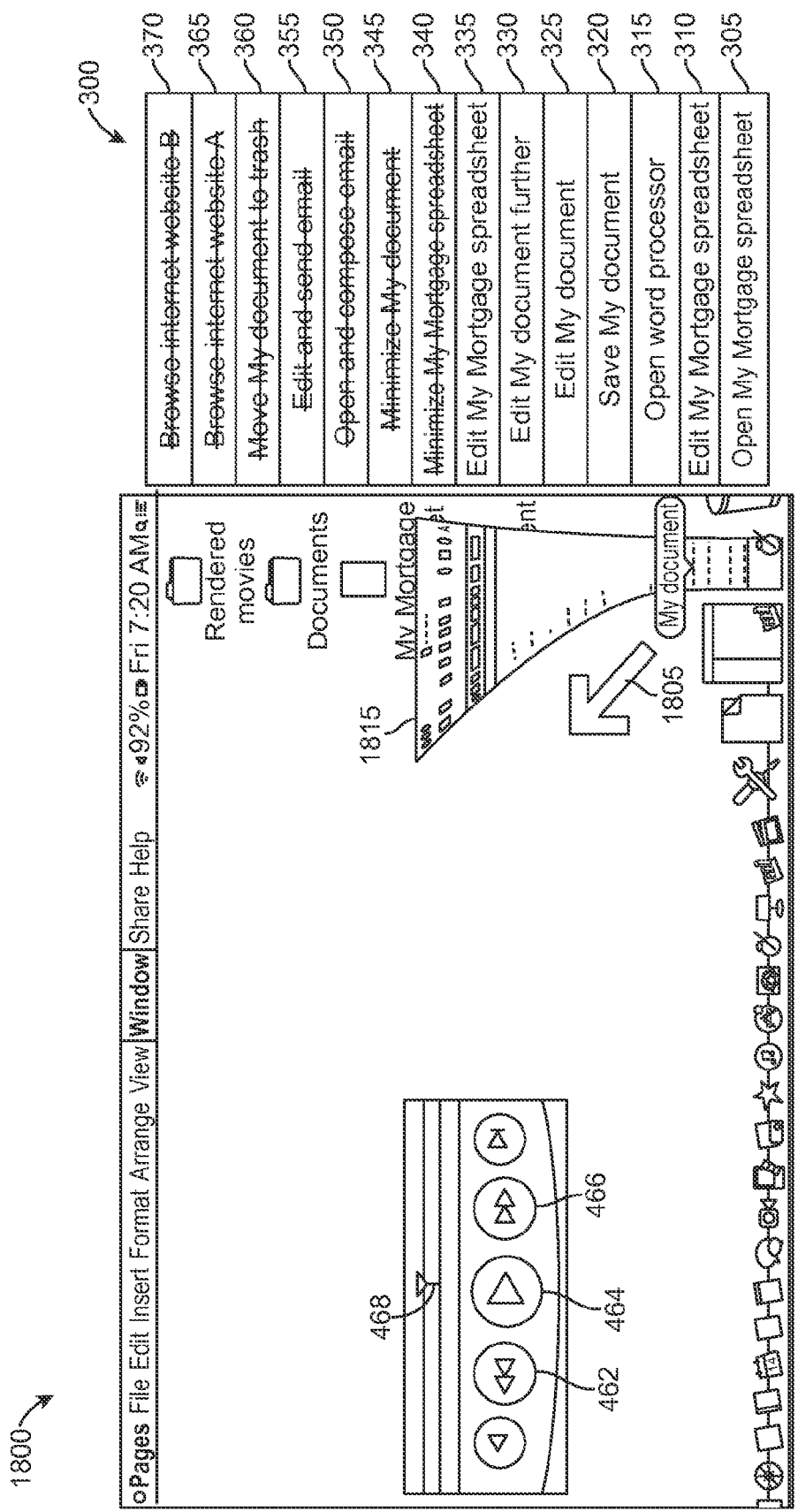

FIGS. 16-18 illustrate a user interface of a computer system and an undo stack in after an undo input is received. FIG. 16 illustrates an undo rewind screenshot 1600 and state of stack 300 after an undo rewind input is received according to an embodiment of the present invention. In some embodiments, an undo user interface can be provided. For example, a media player metaphor as described with reference to FIG. 4 can be provided so as to provide the experience of rewinding and replaying the information displayed on the user interface before receiving an undo rewind user input. For example, an undo gadget 450 can be provided with one or more of the following: play head 468, undo rewind button 462, play button 464, undo fast forward button 466, or the like.

In some embodiments, an undo rewind input can be received. For example, undo rewind input can be received upon a user selecting undo rewind button 462. The undo rewind input can be iterative (e.g., one undo rewind input corresponds to a predetermined number of actions associated with events to rewind and undo), or continuous (e.g., one undo rewind input starts a rewind process that continues until the user indicates a desire to stop the process or the process reaches the last undoable event). For example, a user might hold down an undo rewind button and events can be visually reversed on the display and undone continuously until the user stops holding down the undo rewind button.

Returning to the state of the stack shown in FIG. 15, the last event received was "browse internet website A" 370. Therefore, upon receipt of an undo rewind user input, event 370 is the first event that would be undone and/or visually reversed. The next to last event received was "browse internet website B" 365. Therefore, event 365 is the next event that would be undone and/or visually reversed. For example, the display might show the webpage A followed by webpage B and include other event data in a visually reversed manner (e.g., user navigation within either of the webpages, such as scrolling or zooming, and user input into either of the webpages, such as form filling or search queries). (These intermediate steps are not shown in FIG. 16.)

Upon visually reversing and/or undoing events 370 and 365, stack 300 can be updated to reflect the fact that events 370 and 365 were visually reversed and/or undone. As illustrated, the stack entries are "lined out." However, it is understood that the entries could be deleted or otherwise removed from the list, or the entries could remain in the list and be flagged as "undone." Maintaining the list and flagging events as undone can be beneficial because it can permit convenient implementation of a redo operation.

After events 370 and 365 are visually reversed and/or undone, the next item in the stack is "Move My document to trash" 360. As was described with reference to FIG. 13 (illustrating a file being moved to a different location), a "My document" was moved to the trash, and visual data associated with how the user moved "My document" to the trash was stored and associated with event 360. For example, the icon and/or cursor movement associated with the input that moved the document to the trash can be stored. Upon receipt of an undo rewind user input in screenshot 1600, the user interface can display information that visually reverses the cursor movement associated with the input that moved the document to the trash. Specifically, a video or animation can be shown moving the icon 1610 from the trash location 1620 along path 1615 (in a reverse direction of path 1315 in FIG. 13). The animation or video can continue to show icon 1610 moving along path 1605 to the initial location 1601. Again, stack 300 can be updated to reflect the fact that event 360 has been visually reversed and/or undone.

Many other events can be visually reversed and/or undone. In some embodiments, the change in the displayed information comprises a size of a displayed window being changed from a first size to a second size, and visually reversing the change comprises changing the size of the displayed window from the second size back to the first size. In some embodiments, the change in the displayed information comprises information displayed in a window being scrolled from a first location to a second location, and visually reversing the change comprises scrolling the information displayed in the window from the second location back to the first location. These examples are for illustration only and one having skill in the art will recognize that any change in the information displayed on a display associated with a computing device can be stored and visually reversed responsive to an undo rewind input.

FIG. 17 illustrates an undo rewind screenshot 1700 and state of stack 300 after an undo rewind input is received, subsequent to FIG. 16, according to an embodiment of the present invention. After the event 360 is undone or rewound, as shown in FIG. 16, the next item to be undone/rewound is event 355 (e.g., Send email). As described above, some actions cannot be undone. Sending an email is one example of an event that cannot be undone. Other events are possible, and may include types of events that send data or receive data from an external computer system.

Responsive to an undo input when an event is not undoable, the user interface may display a notification indicating the particular event is not an undoable event. For example, a notification 1710 can be used. Stack 300 can be updated to reflect that the event 355 has been rewound and/or that the event was not undoable. As illustrated, event 355 is lined out in stack 300.

FIG. 18 illustrates an undo rewind screenshot 1800 and state of stack 300 after an undo rewind input is received, after FIG. 17, according to an embodiment of the present invention. Screenshot 1800 shows undo stack 300 after events 350 and 345 have been visually reversed and/or undone, and as event 340 is being visually reversed and/or undone. For example, responsive to an undo input, an animation or video of "My document" 1815 can be shown that illustrates the document popping out of the Dock (i.e., the reverse of the input that occurred in FIG. 10). Document 1815 goes from minimized state to a maximized state in the direction of arrow 1805 in this example.

While the invention has been described with respect to specific embodiments, one skilled in the art will recognize that numerous modifications are possible. Portions of the description may refer to particular user interfaces, such as touchscreen displays, other touch-sensitive surfaces, or point-and-click interfaces. Other embodiments may use different interfaces. For example, a user interface can be voice-based, with the user speaking instructions into a microphone or other audio input device and the device providing an audible response (e.g., using synthesized speech or pre-recorded audio clips) in addition to or instead of visual responses as described above. A combination of voice-based and visual interface elements can be used, and in some embodiments, multiple different types of interfaces can be supported, with the user having the option to select a desired interface, to use multiple interfaces in combination (e.g., reading information from the screen and speaking instructions) and/or to switch between different interfaces. Any desired form of user interaction with a device can be supported.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer programs incorporating various features of the present invention may be encoded and stored on various computer-readable storage media. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; CD ROM and DVD ROM disks; and other non-transitory media. The processor and the memory can be supplemented by, or incorporated in, special purpose logic circuitry. Computer-readable media encoded with the program code may be packaged with a compatible electronic device, or the program code may be provided separately from electronic devices (e.g., via Internet download or as a separately packaged computer-readable storage medium).

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, although the invention has been described with respect to specific embodiments, it will be appreciated that the invention is intended to cover all modifications and equivalents within the scope of the following claims. For example, the actions recited in the claims can be performed in a different order and still achieve desirable results.

What is claimed is:
1. A method, comprising:
at a computing device having a display:
receiving, from a plurality of applications executed by the computing device, a sequence of events, wherein the plurality of applications includes a first application and a second application, and the sequence of events includes events that cause changes in information displayed by the display;
storing the sequence of events in a shared ordered list, wherein the shared ordered list includes:
a first application event that corresponds to an operation performed within the first application,
a system event that corresponds to opening an application, and
a second application event that corresponds to an operation performed within the second application that is different from the first application,
wherein:
the first application event, the system event, and the second application event are executed by the computing device as the events occurred in time starting with a first event and ending with a last event, and
the first application event, the system event, and the second application event are associated with visual changes in a user interface displayed on the display;

receiving an input corresponding to a selection of an undo operation; and in response to receiving the input, undoing events in the sequence of events in two or more of the plurality of applications in the computing device, wherein:

undoing events includes beginning the undo operation with the last event in the shared ordered list wherein the last event occurred most recently in time; and undoing events in the sequence of events in two or more of the plurality of applications in the computing device includes:

undoing the second application event in the second application in response to receiving the input;

after undoing the second application event in response to receiving the input, undoing the first application event in the first application in response to receiving the input; and visually reversing the visual changes in the user interface displayed on the display that correspond to the first application event, the system event, and the second application event.

2. The method of claim 1, wherein the undo operation causes a change in displayed information in two or more of the plurality of applications.

3. The method of claim 1, wherein storing the sequence of events in the shared ordered list includes linking to the shared ordered list visual event data for a plurality of respective events in the sequence of events, wherein the visual event data includes a sequence of images showing changes in information displayed by the display during execution of the plurality of respective events, the sequence of images including at least one sequence of images for each application of the two or more applications.

4. The method of claim 3, wherein undoing events in the sequence of events in two or more of the plurality of applications includes visually reversing the linked visual event data for the plurality of respective events in the sequence of events.

5. The method of claim 1, wherein storing the sequence of events in the shared ordered list further includes storing one or more animations associated with a respective event of the sequence of events and further wherein undoing events in the sequence of events in two or more of the plurality of applications further includes visually reversing the one or more animations associated with the respective event.

6. The method of claim 1, wherein the plurality of applications are two or more distinct applications selected from the group consisting of file manager applications, word processing applications, spreadsheet applications, presentation applications, internet browsers, messaging applications, email applications, video editing applications, audio editing applications, calendar applications, address book applications, media players, settings manipulation applications, search windows, notification applications, and desktop applications.

7. The method of claim 1, wherein the plurality of applications include a file management application, and the sequence of events include one or more events in the file management application and one or more events in an application other than the file management application.

8. The method of claim 1, wherein the shared ordered list is displayed on the display.

9. A computing device, comprising:
a display;
one or more data processors; and
one or more non-transitory computer-readable storage media including instructions that when executed by the one or more data processors cause the computing device to perform operations including:

receiving, from a plurality of applications executed by the computing device, a sequence of events, wherein the plurality of applications includes a first application and a second application, and the sequence of events includes events that cause changes in information displayed by the display;

storing the sequence of events in a shared ordered list, wherein the shared ordered list includes:

a first application event that corresponds to an operation performed within the first application, a system event that corresponds to opening an application, and a second application event that corresponds to an operation performed within the second application that is different from the first application, wherein:

the first application event, the system event, and the second application event are executed by the computing device as the events occurred in time starting with a first event and ending with a last event, and the first application event, the system event, and the second application event are associated with visual changes in a user interface displayed on the display;

receiving an input corresponding to a selection of an undo operation; and in response to receiving the input, undoing events in the sequence of events in two or more of the plurality of applications in the computing device, wherein:

undoing events includes beginning the undo operation with the last event in the shared ordered list wherein the last event occurred most recently in time; and undoing events in the sequence of events in two or more of the plurality of applications in the computing device includes:

undoing the second application event in the second application in response to receiving the input;

after undoing the second application event in response to receiving the input, undoing the first application event in the first application in response to receiving the input; and visually reversing the visual changes in the user interface displayed on the display that correspond to the first application event, the system event, and the second application event.

10. The computing device of claim 9, wherein the undo operation causes a change in displayed information in two or more of the plurality of applications.

11. The computing device of claim 9, wherein storing the sequence of events in the shared ordered list includes linking to the shared ordered list visual event data for a plurality of respective events in the sequence of events, wherein the visual event data includes a sequence of images showing changes in information displayed by the display during execution of the plurality of respective events, the sequence of images including at least one sequence of images for each application of the two or more applications.

12. The computing device of claim 11, wherein undoing events in the sequence of events in two or more of the plurality of applications includes visually reversing the linked visual event data for the plurality of respective events in the sequence of events.

13. The computing device of claim 9, wherein storing the sequence of events in the shared ordered list further includes storing one or more animations associated with a respective event of the sequence of events and further wherein undoing events in the sequence of events in two or more of the plurality of applications further includes visually reversing the one or more animations associated with the respective event.

14. The computing device of claim 9, wherein the plurality of applications are two or more distinct applications selected from the group consisting of file manager applications, word processing applications, spreadsheet applications, presentation applications, internet browsers, messaging applications, email applications, video editing applications, audio editing applications, calendar applications, address book applications, media players, settings manipulation applications, search windows, notification applications, and desktop applications.

15. The computing device of claim 9, wherein the plurality of applications include a file management application, and the sequence of events include one or more events in the file management application and one or more events in an application other than the file management application.

16. The computing device of claim 9, wherein the shared ordered list is displayed on the display.

17. A computer-program product tangibly embodied in a non-transitory machine-readable storage medium, including instructions configured to cause a computing device having a display to:
  receive, from a plurality of applications executed by the computing device, a sequence of events, wherein the plurality of applications includes a first application and a second application, and the sequence of events includes events that cause changes in information displayed by the display;
  store the sequence of events in a shared ordered list, wherein the shared ordered list includes:
    a first application event that corresponds to an operation performed within the first application,
    a system event that corresponds to opening an application, and
    a second application event that corresponds to an operation performed within the second application that is different from the first application,
    wherein:
      the first application event, the system event, and the second application event are executed by the computing device as the events occurred in time starting with a first event and ending with a last event; and
      the first application event, the system event, and the second application event are associated with visual changes in a user interface displayed on the display;
  receive an input corresponding to a selection of an undo operation; and
  in response to receiving the input, undo events in the sequence of events in two or more of the plurality of applications in the computing device, wherein:
    undoing events includes beginning the undo operation with the last event in the shared ordered list wherein the last event occurred most recently in time; and
    undoing events in the sequence of events in two or more of the plurality of applications in the computing device includes:
      undoing the second application event in the second application in response to receiving the input;
      after undoing the second application event in response to receiving the input, undoing the first application event in the first application in response to receiving the input; and
      visually reversing the visual changes in the user interface displayed on the display that correspond to the first application event, the system event, and the second application event.

18. The computer-program product of claim 17, wherein the undo operation causes a change in displayed information in two or more of the plurality of applications.

19. The computer-program product of claim 17, wherein storing the sequence of events in the shared ordered list includes linking to the shared ordered list visual event data for a plurality of respective events in the sequence of events, wherein the visual event data includes a sequence of images showing changes in information displayed by the display during execution of the plurality of respective events, the sequence of images including at least one sequence of images for each application of the two or more applications.

20. The computer-program product of claim 19, wherein undoing events in the sequence of events in two or more of the plurality of applications includes visually reversing the linked visual event data for the plurality of respective events in the sequence of events.

21. The computer-program product of claim 17, wherein storing the sequence of events in the shared ordered list further includes storing one or more animations associated with a respective event of the sequence of events and further wherein undoing events in the sequence of events in two or more of the plurality of applications further includes visually reversing the one or more animations associated with the respective event.

22. The computer-program product of claim 17, wherein the plurality of applications are two or more distinct applications selected from the group consisting of file manager applications, word processing applications, spreadsheet applications, presentation applications, internet browsers, messaging applications, email applications, video editing applications, audio editing applications, calendar applications, address book applications, media players, settings manipulation applications, search windows, notification applications, and desktop applications.

23. The computer-program product of claim 17, wherein the plurality of applications include a file management application, and the sequence of events include one or more events in the file management application and one or more events in an application other than the file management application.

24. The computer-program product of claim 17, wherein the shared ordered list is displayed on the display.

25. The method of claim 1, wherein the sequence of events stored in the shared ordered list further includes a system event selected from the group consisting of a window resizing, expanding a window, minimizing a window, and movement of a displayed cursor over time.

26. The method of claim 4, wherein the visually reversing includes:
  using the shared ordered list, visually reversing linked visual event data for the second application event in the second application, and subsequently, visually reversing linked visual event data for the first application event in the first application.

* * * * *